US011361489B2

United States Patent
Yang et al.

(10) Patent No.: US 11,361,489 B2
(45) Date of Patent: *Jun. 14, 2022

(54) DENSE CAPTIONING WITH JOINT INTERFERENCE AND VISUAL CONTEXT

(71) Applicant: Snap Inc., Santa Monica, CA (US)

(72) Inventors: Linjie Yang, Los Angeles, CA (US); Kevin Dechau Tang, Los Angeles, CA (US); Jianchao Yang, Los Angeles, CA (US); Jia Li, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,346

(22) Filed: Jun. 17, 2020

(65) Prior Publication Data
US 2020/0320353 A1 Oct. 8, 2020

Related U.S. Application Data

(63) Continuation of application No. 16/226,035, filed on Dec. 19, 2018, now Pat. No. 10,726,306, which is a
(Continued)

(51) Int. Cl.
*G06K 9/62* (2022.01)
*G06T 11/60* (2006.01)
(Continued)

(52) U.S. Cl.
CPC ............ *G06T 11/60* (2013.01); *G06K 9/6269* (2013.01); *G06K 9/6274* (2013.01); *G06T 7/11* (2017.01);
(Continued)

(58) Field of Classification Search
None
See application file for complete search history.

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015

OTHER PUBLICATIONS

Johnson et al., "DenseCap: Fully Convolutional Localization Networks for Dense Captioning," CVPR 2016, Nov. 24, 2015 (Year: 2015).*
(Continued)

*Primary Examiner* — Soo Shin
(74) *Attorney, Agent, or Firm* — Schwegman Lundberg & Woessner, P.A.

(57) ABSTRACT

A dense captioning system and method is provided for analyzing an image to generate proposed bounding regions for a plurality of visual concepts within the image, generating a region feature for each proposed bounding region to generate a plurality of region features of the image, and determining a context feature for the image using a proposed bounding region that is a largest in size of the proposed bounding regions. For each region feature of the plurality of region features of the image, the dense captioning system and method further provides for analyzing the region feature to determine for the region feature a detection score that indicates a likelihood that the region feature comprises an actual object, and generating a caption for a visual concept in the image using the region feature and the context feature when a detection score is above a specified threshold value.

20 Claims, 17 Drawing Sheets

Related U.S. Application Data continuation of application No. 15/348,501, filed on Nov. 10, 2016, now Pat. No. 10,198,671.

(51) Int. Cl.
| | |
|---|---|
| *G06T 7/11* | (2017.01) |
| *G06V 10/25* | (2022.01) |
| *G06V 10/70* | (2022.01) |
| *G06V 10/82* | (2022.01) |
| *G06V 20/20* | (2022.01) |
| *G06V 20/70* | (2022.01) |

(52) U.S. Cl.
CPC ............ *G06V 10/25* (2022.01); *G06V 10/768* (2022.01); *G06V 20/20* (2022.01); *G06T 2210/12* (2013.01)

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf. et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 10,198,671 B1 | 2/2019 | Yang et al. |
| 10,467,274 B1 | 11/2019 | Ren et al. |
| 10,726,059 B1 | 7/2020 | Ren et al. |
| 10,726,306 B1 | 7/2020 | Yang et al. |
| 11,126,003 B2 * | 9/2021 | Osterhout ............ G02B 27/281 |
| 2011/0202598 A1 | 8/2011 | Evans et al. |
| 2012/0008864 A1 | 1/2012 | Kanatsu et al. |
| 2012/0209924 A1 | 8/2012 | Evans et al. |
| 2013/0273968 A1* | 10/2013 | Rhoads ................... H04W 4/50 455/556.1 |
| 2014/0376819 A1* | 12/2014 | Liu ...................... G06K 9/3233 382/205 |
| 2016/0048849 A1* | 2/2016 | Shiftan .................. G06Q 50/01 705/7.29 |
| 2017/0132526 A1* | 5/2017 | Cohen ..................... G06N 5/022 |
| 2017/0169314 A1* | 6/2017 | Dijkman .............. G06K 9/6261 |
| 2017/0200065 A1 | 7/2017 | Wang et al. |
| 2017/0200066 A1 | 7/2017 | Wang et al. |
| 2017/0255832 A1* | 9/2017 | Jones ................... G06N 3/0454 |
| 2018/0008431 A1 | 3/2018 | Katz et al. |
| 2018/0084310 A1* | 3/2018 | Katz .................. G06Q 30/0242 |
| 2018/0144248 A1* | 5/2018 | Lu ....................... G06K 9/00986 |
| 2018/0144265 A1 | 5/2018 | Bonawitz et al. |

OTHER PUBLICATIONS

Ren et al., "Faster R-CNN: Towards Real-Time Object Detection with Region Proposal Networks," IEEE Transactions on Pattern Analysis and Machine Intelligence, vol. 39, No. 6, Jun. 1, 2017, published Jun. 6, 2016 (Year: 2016).*

Ilievski et al., "A Focused Dynamic Attention Model for Visual Question Answering," Apr. 6, 2016, arXiv preprint arXiv:1604. 01485 (Year: 2016).*

U.S. Appl. No. 15/348,501 U.S. Pat. No. 10,198,671, filed Nov. 10, 2016, Dense Captioning With Joint Interference and Visual Context.

U.S. Appl. No. 16/226,035, filed Dec. 19, 2018, Dense Captioning With Joint Interference and Visual Context.

U.S. Appl. No. 15/808,617 U.S. Pat. No. 10,467,274, filed Nov. 9, 2017, Deep Reinforcement Learning-Based Captioning With Embedding Reward.

U.S. Appl. No. 16/448,900, filed Jun. 21, 2019, Deep Reinforcement Learning-Based Captioning With Embedding Reward.

U.S. Appl. No. 16/722,776, filed Dec. 20, 2019, Deep Reinforcement Learning-Based Captioning With Embedding Reward.

"U.S. Appl. No. 15/348,501, Non Final Office Action dated Apr. 11, 2018", 21 pgs.

"U.S. Appl. No. 15/348,501, Notice of Allowance dated Oct. 1, 2018", 11 pgs.

"U.S. Appl. No. 15/348,501, Response filed Jul. 10, 2018 to Non Final Office Action dated Apr. 11, 2018", 20 pgs.

"U.S. Appl. No. 15/808,617, Notice of Allowance dated Apr. 23, 2019", 14 pgs.

"U.S. Appl. No. 15/808,617, PTO Response to Rule 312 Communication dated Jul. 22, 2019", 2 pgs.

"U.S. Appl. No. 15/808,617, PTO Response to Rule 312 Communication dated Oct. 8, 2019", 2 pgs.

"U.S. Appl. No. 16/226,035, Non Final Office Action dated Dec. 27, 2019", 8 pgs.

"U.S. Appl. No. 16/226,035, Notice of Allowance dated Mar. 25, 2020", 13 pgs.

"U.S. Appl. No. 16/226,035, Response filed Feb. 19, 2020 to Non Final Office Action dated Dec. 27, 2019", 6 pgs.

"U.S. Appl. No. 16/448,900, Non Final Office Action dated Jul. 5, 2019", 12 pgs.

"U.S. Appl. No. 16/448,900, Notice of Allowance dated Oct. 31, 2019", 14 pgs.

"U.S. Appl. No. 16/448,900, PTO Response to Rule 312 Communication dated Apr. 1, 2020", 2 pgs.

"U.S. Appl. No. 16/448,900, PTO Response to Rule 312 Communication dated Jun. 9, 2020", 2 pgs.

"U.S. Appl. No. 16/448,900, Response filed Oct. 3, 2019 to Non-Final Office Action dated Jul. 5, 2019", 8 pgs.

Antol, Stanislaw, et al., "Visual question answering", (May 3, 2015), 16 pgs.

Banerjee, S., et al., "An automatic metric for MT evaluation with improved correlation with human judgments", ACL Workshop, (2005), 8 pgs.

Bell, Sean, et al., "Inside-Outside Net : Detecting Objects in Context With Skip Pooling and Recurrent Neural Networks", (Dec. 14, 2015), 11 pgs.

Bengio, Y, "Curriculum learning", ICML 2009, (2009), 8 pgs.

Bengio, Yoshua, et al., "A neural probabilistic language model", Journal of Machine Learning Research 3, (2003), 1137-1155.

Chen, Xinlei, et al., "A recurrent visual representation for image caption generation", CVPR 2015, (2015), 10 pgs.

Chen, Xinlei, et al., "Microsoft COCO Captions: Data Collection and Evaluation Server", arXiv. (Apr. 3, 2015), 7 pgs.

Cho, Kyunghyun, et al., "Learning Phrase Representations using RNN Encoder-Decoder for Statistical Machine Translation", Proceedings of the 2014 Conference on Empirical Methods in Natural Language Processing EMNLP, (2014), 11 pgs.

Chung, J, et al., "Empirical Evaluation of Gated Recurrent Neural Networks on Sequence Modeling", arXiv:1412.3555v1, (2014), 9 pgs.

Dai, Jifeng, et al., "Instance-aware Semantic Segmentation via Multi-task Network Cascades", CVPR, 2016, (Dec. 14, 2015), 10 pgs.

Deng, Jia, et al., "ImageNet: A large-scale hierarchical image database", In Proceedings of IEEE Conference on Computer Vision and Pattern Recognition, CVPR 2009., (Jun. 20, 2009), 8 pgs.

Divvala, Santosh, et al., "An empirical study of context in object detection", CVPR 2009, 8 pgs.

Donahue, Jeff, et al., "Long-term Recurrent Convolutional Networks for Visual Recognition and Description", CVPR, 2015, 2625-2634.

(56) References Cited

OTHER PUBLICATIONS

Elhoseiny, Mohamed, et al., "Automatic Annotation of Structured Facts in Images", arXiv:1604.00466, (2016), 19 pgs.
Elliot, Desmond, et al., "Image Description using Visual Dependency Representations", Proceedings of the 2013 Conference on Empirical Methods in Natural Language Processing, (2013), 11 pgs.
Everingham, M., et al., "The PASCAL Visual Object Classes Challenge Workshop 2012", [Online]. Retrieved from the Internet: <URL:http://pascallin.ecs.soton.ac.uk/challenges/VOC/voc2012/workshop/index.html>, (2012), 5 pgs.
Fang, Hao, et al., "From captions to visual concepts and back", Microsoft Research—CVPR, 2015, (2015), 10 pgs.
Farhadi, Ali, et al., "Every Picture Tells a Story: Generating Sentences from Images", ECCV 2010, (2010), 14 pgs.
Frome, et al., "DeViSE: A Deep Visual-Semantic Embedding Model", In Proceedings of Advances in Neural Information Processing Systems, (Dec. 5, 2013), 9 pgs.
Girshick, Ross, et al., "Fast R-CNN", In Journal of Computing Research Repository, (Apr. 2015), 1440-1448.
Girshick, Ross, et al., "Rich Feature Hierarchies for Accurate Object Detection and Semantic Segmentation", Proceedings of the 2014 IEEE Conference on Computer Vision and Pattern Recognition (CVPR), (2014), 8 pgs.
He, Kaiming, et al., "Deep Residual Learning for Image Recognition", 2016 IEEE Conference on Computer Vision and Pattern Recognition, (2016), 770-778.
Hendricks, Lisa Anne, et al., "Deep Compositional Captioning: Describing Novel Object Categories without Paired Training Data", arXiv:1511.05284v2, (Apr. 27, 2016), 18 pgs.
Hochreiter, Sepp, et al., "Long Short-Term Memory", Neural computation, 9(8), (1997), 1735-1780.
Hu, Ronghang, et al., "Natural language object retrieval", CVPR, 2016, 14 pgs.
Ilievski, Ilija, et al., "A Focused Dynamic Attention Model for Visual Question Answering", arXiv preprint arXiv:1604.01485, (Apr. 6, 2016), 15 pgs.
Jaderberg, Max, et al., "Spatial Transformer Networks", NIPS, arXiv:1506.02025v3, (2016), 15 pgs.
Jia, Xu, et al., "Guiding Long-Short term memory for image caption generation", arXiv:1509.04942v1, (Sep. 16, 2015), 9 pgs.
Jia, Y., et al., "Caffe: Convolutional architecture for fast feature embedding.", ACM, (2014), 4 pgs.
Jiang, Huaizu, et al., "Face detection with the faster R-CNN", CoRR, abs/1606.03473, 2016, (Jun. 10, 2016), 6 pgs.
Jin, Junqi, et al., "Aligning where to see and what to tell: image caption with region-based attention and scene factorization", CoRR, abs/1506.06272, 2015, (Jun. 23, 2015), 20 pgs.
Johnson, Justin, et al., "Densecap: Fully convolutional localization networks for dense captioning", CVPR, 2016, (Nov. 24, 2015), 10 pgs.
Karpathy, Andrej, et al., "Deep fragment embeddings for bidirectional image sentence mapping", In Proceedings of Annual Conference on Neural Information Processing Systems, NIPS, 2014, (Dec. 8, 2014), 9 pgs.
Karpathy, Andrej, et al., "Deep visual-semantic alignments for generating image descriptions", CVPR, (2015), 17 pgs.
Kingma, Diederik P, et al., "Adam: A Method for Stochastic Optimization", arXiv:1412.6980v9 [cs.LG], (Jan. 30, 2017), 15 pgs.
Kiros, et al., "Unifying Visual-Semantic Embeddings with Multimodal Neural Language Models", In Proceedings of the Computing Research Repository, (Nov. 2014), 13 pgs.
Koch, C, et al., "Shifts in selective visual attention: towards the underlying neural circuitry", Human Neurobiology 1985, (1985), 9 pgs.
Konda, Vijay R, et al., "Actor-Critic Algorithms", Laboratory for information and Decision Systems, Massachusetts Institute of Technology, (1999), 7 pgs.
Krishna, Ranjay, et al., "Visual genome: Connecting language and vision using crowdsourced dense image annotations", [Online] Retrieved from the Internet: <URL: http://arxiv. org/abs/1602.07332>, (2016), 45 pgs.
Krizhevsky, Alex, et al., "Imagenet classification with deep convolutional neural networks", Advances in neural information processings systems, (2012), 1-9.
Kulkarni, "Baby talk: Understanding and Generating Simple Image Descriptions", In Proceedings of IEEE Computer Vision and Pattern Recognition, (Jun. 20, 2011), 1601-1608.
Kuznetsova, et al., "Collective Generation of Natural Image Descriptions", In Proceedings of the 50th Annual Meeting of the Association for Computational Linguistics: Long Papers—vol. 1, (Jul. 8, 2012), 10 pgs.
Lavie, Alon, et al., "The METEOR metric for automatic evaluation of Machine Translation", Language technologies Institute, (2009), 16 pgs.
Lebret, Remi, et al., "Simple Image Description Generator Via a Linear Phrase-Based Model", arXiv:1412.8419v3, (2015), 7 pgs.
Lecun, Yann, et al., "Gradient, based learning applied to document recognition", Proceedings of the IEEE, 86(11): 2278-2324, 1998, (Nov. 1998), 46 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Li, et al., "Composing Simple Image Descriptions using web-scale n-grams", In Proceedings of the Fifteenth Conference on Computational Natural Language Learning, (Jun. 23, 2011), 9 pgs.
Lin, Chin Yew, "ROUGE: A Package for Automatic Evaluation of Summaries", Information Sciences Institute University of Southern California, (2004), 8 pgs.
Lin, Tsung-Yi, et al., "Microsoft COCO: Common Objects in Context", ECCV, arXiv:1405.0312, (2014), 1-15.
Liu, Wei, et al., "SSD: Single Shot MultiBox Detector", CVPR, arXiv:1512.02325v5 [cs.CV] Dec. 29, 2016, (2016), 17 pgs.
Long, Jonathan, et al., "Fully Convolutional Networks for Semantic Segmentation", IEEE Conference on Computer Vision and Pattern Recognition (CVPR), Boston, MA, (Jun. 2015), 10 pgs.
Malinowski, Mateusz, et al., "Ask your neurons: A neural-based approach to answering questions about images", ICCV, 2015, 9 pgs.
Mao, et al., "Deep Captioning with Multimodal Recurrent Neural Networks (m-RNN)", In Proceedings of 3rd International Conference on Learning Representations, (May 7, 2015), 17 pgs.
Mao, Junhua, et al., "Explain images with multimodal recurrent neural networks", arXiv:1410.1090, 2014, (Oct. 4, 2014), 9 pgs.
Mao, Junhua, et al., "Generation and comprehension of unambiguous object descriptions", CVPR,2016, 11-20.
Mikolov, Tomas, et al., "Recurrent neural network based language model", Interspeech 2010, 1045-1048.
Mnih, Volodymyr, "Asynchronous Methods for Deep Reinforcement Learning", arXiv:1602.01783v2, (Jun. 16, 2016), 19 pgs.
Mnih, Volodymyr, et al., "Human-level control through deep reinforcement learning", Nature, vol. 518, Feb. 26, 2015, pp. 529-542, (Feb. 26, 2015), 529-542.
Mottaghi, Roozbeh, et al., "The role of context for object detection and semantic segmentation in the wild", CVPR,2014, 8 pgs.
Nagaraja, Varun, et al., "Modeling context, between objects for referring expression understanding", ECCV, 2016, 36 pgs.
Pan, Yingwei, et al., "Jointly modeling embedding and translation to bridge video and language", arXiv:1505.01861v3, (Apr. 6, 2015), 10 pgs.
Papineni, KIshore, et al., "BLEU: a Method for Automatic Evaluation of Machine Translation", ACL, 2002, 8 pgs.
Ranzato, Marc'Aurello, et al., "Sequence level training with recurrent neural networks", ICLR 2016, (Jun. 5, 2016), 16 pgs.
Redmon, Joseph, et al., "You only look once: Unified, real-time object detection", CVPR, 2016, (May 9, 2016), 10 pgs.
Ren, Shaoqing, et al., "Faster R-CNN: Towards Real-Time Object Detection with Region Proposal Networks", IEEE Transactions on Pattern Analysis and Machine Intelligence, 39(6)., (2017), 1137-1149.
Ren, Zhuo, et al., "Joint image-Text Representation by Gaussian Visual-Semantic embedding", ACM 2016, (Oct. 15, 2016), 5 pgs.

(56) References Cited

OTHER PUBLICATIONS

Ren, Zhuo et al., "Multi-Instance Visual-Semantic Embedding", arXiv:1512.06963v1, (Dec. 22, 2015), 9 pgs.
Silver, David, et al., "Mastering the game of Go with deep neural networks and tree search", nature, vol. 529, 2016, (Jan. 28, 2016), 484-503.
Simonyan, Karen, et al., "Very Deep Convolutional Networks for Large-Scale Image Recognition.", ICLR 2015, arXiv:1409.1556, (Apr. 10, 2015), 14 pgs.
Sutskever, Ilya, et al., "Generating Text with Recurrent Neural Networks", ICML, 2011, 8 pgs.
Sutton, Richard S, et al., "Policy Gradient Methods for Reinforcement Learning with Function Approximation", AT and T labs, (2000), 7 pgs.
Szegedy, C., et al., "Going deeper with convolutions.", Proceedings of the IEEE Conference on Computer Vision and Pattern Recognition, (2015), 1-12.
Vedantam, Ramakrishna, et al., "CIDEr: Consensus-based image description evaluation", CVPR, 2015, (Jun. 3, 2015), 17 pgs.
Vijayakumar, Ashwin K, et al., "Diverse Beam Search: Decoding Diverse Solutions from Neural Sequence Models", arXiv:1610.02424v1, (Oct. 7, 2016), 14 pgs.
Vinyals, Oriol, et al., "Show and tell: A neural image caption generator", ICCV, 2015, (2015), 3156-3164.
Werbos, P.J., "Generalization of backpropagation with application to a recurrent gas market model", Neural Networks, 1(4):, (1988), 339-356.
Williams, Ronald J, "Simple Statistical Gradient-Following Algorithms for Connectionist Reinforcement Learning", Machine Learning 8, (1992), 229-256.
Xu, Kelvin, et al., "Show, attend and tell: Neural image caption generation with visual attention", NIPS, (Apr. 19, 2016), 22 pgs.
Yang, Yezhou, et al., "Corpus-Guided Sentence Generation of Natural Images", University of Maryland Institute for Advanced Computer Studies, (2011), 11 pgs.
You, Quanzeng, et al., "Image Captioning with Semantic Attention", arXiv:1603.03925v1, (Mar. 12, 2016), 10 pgs.
Young, Peter, et al., "From image descriptions to visual denotations: New similarity metrics for semantic inference over event descriptions", TACL, 2:67-78, 2014, (2014), 67-78.
Yu, Licheng, et al., "Modeling context in referring expressions", ECCV, 2016, (Aug. 10, 2016), 19 pgs.
Zhu, Yuke, et al., "Target-driven Visual Navigation in Indoor Scenes using Deep Reinforcement Learning", arXiv:1609.05143v1, (2016), 8 pgs.
"U.S. Appl. No. 16/448,900, Corrected Notice of Allowability dated Jun. 29, 2020", 2 pgs.
"U.S. Appl. No. 16/722,776, Non Final Office Action dated Oct. 14, 2021", 14 pgs.
"U.S. Appl. No. 16/722,776, Response filed Jan. 7, 2022 to Non Final Office Action dated Oct. 14, 2021", 8 pgs.
"U.S. Appl. No. 16/722,776, Notice of Allowance dated Jan. 24, 2022", 13 pgs.

\* cited by examiner

DENSE CAPTIONING WITH JOINT INTERFERENCE AND VISUAL CONTEXT

CLAIM OF PRIORITY

This application is a continuation of and claims the benefit of priority of U.S. patent application Ser. No. 16/226,035, filed on Dec. 19, 2018, which is a continuation of and claims the benefit of priority of U.S. patent application Ser. No. 15/348,501, filed on Nov. 10, 2016, each of which is hereby incorporated by reference herein in their entireties.

BACKGROUND

Dense captioning is a newly emerging computer vision topic for understanding images with dense language descriptions. The goal of dense captioning is to densely detect visual concepts (e.g., objects, object parts, interactions between objects, scenes, events, etc.) from images, and to label each visual concept with a short descriptive phrase.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
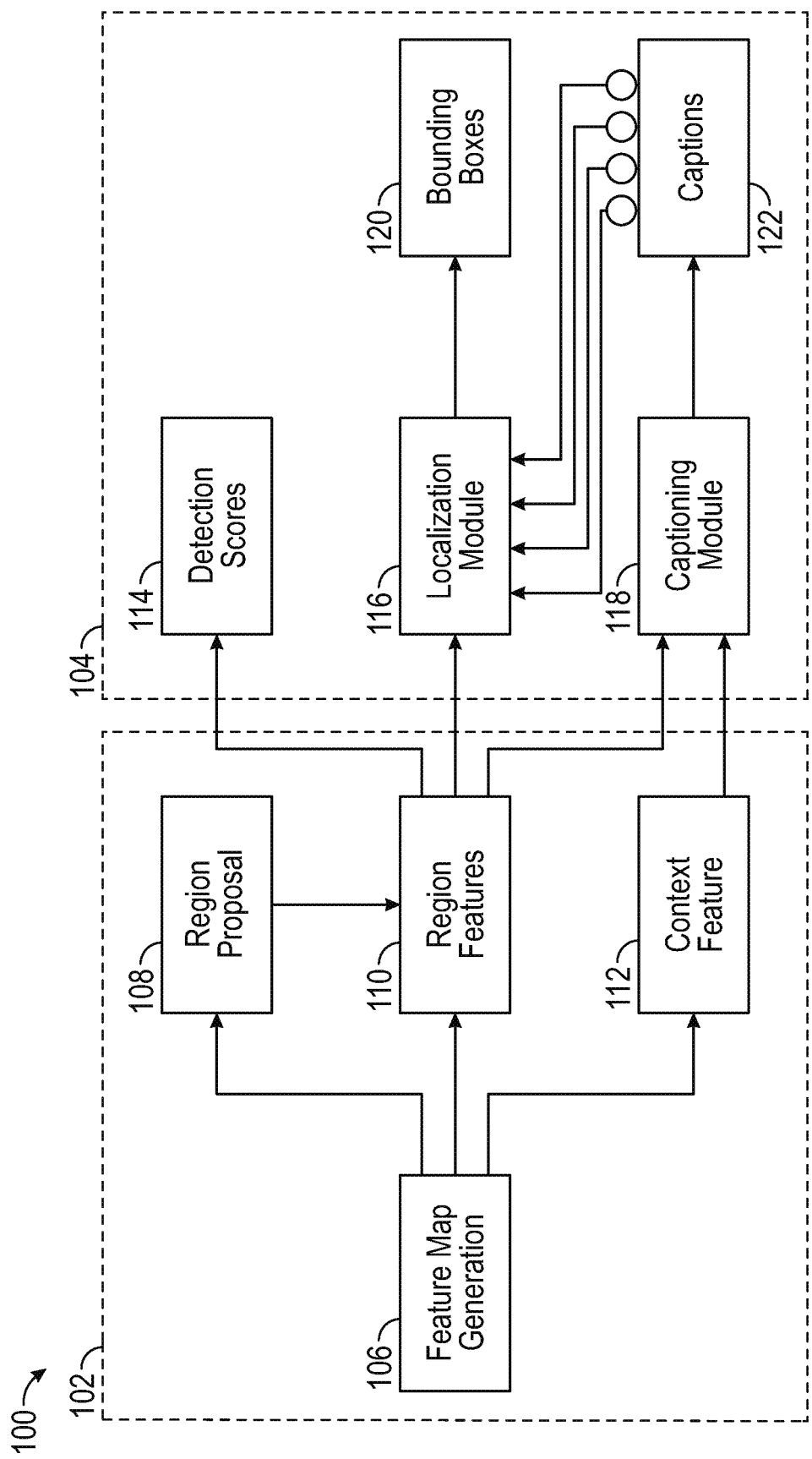
FIG. 1 is a block diagram illustrating a dense captioning network, according to some example embodiments.

Systems and methods described herein relate to a novel dense captioning system which incorporates joint interference and context fusion. As explained above, the goal of dense captioning is to densely detect visual concepts from images, and to label each visual concept with a short descriptive phrase. A visual concept may include an object, an object part, an interaction between objects, a scene, an event, or other aspect of an image. There are various challenges of dense captioning. One example is that abundant visual concept annotations in each image are associated to highly overlapping target regions, which makes accurate localization of each visual concept challenging. Another example is that the large amount of visual concepts makes it hard to recognize each of the visual concepts by its appearance alone. In one example embodiment, a new model pipeline is described based on two novel ideas of joint inference and context fusion, to alleviate at least these two challenges. The model architecture is described herein along with evaluation of variations in architecture. In one example embodiment, a model is described that is compact and efficient, and achieves state-of-the-art accuracy on Visual Genome for dense captioning with a relative gain of 73% compared to a previous best algorithm. Qualitative experiments also reveal the capability of the example model in addressing the problem of dense captioning.

In one example embodiment a dense captioning system is provided for processing an image to produce a feature map of the image, analyzing the feature map to generate proposed bounding boxes for a plurality of visual concepts within the image, analyzing the feature map to determine a plurality of region features of the image, and analyzing the feature map to determine a context feature for the image. For each region feature of the plurality of region features of the image, the dense captioning system further provides for analyzing the region feature to determine a detection score for the region feature, calculating a caption for a bounding box for a visual concept in the image using the region feature and the context feature, and localizing the visual concept by adjusting the bounding box around the visual concept based on the caption to generate an adjusted bounding box for the visual concept.

The computer vision community has recently witnessed the success of deep neural networks for image captioning, in which a sentence is generated to describe a given image. Challenging as it seems, a list of pioneering approaches have achieved remarkable success on datasets such as Flicker30k and MS COCO. For evaluation, metrics in natural language processing are employed to measure the similarity between ground truth captions and predictions, such as BLEU, Meteor, and CIDEr. However, the holistic image descriptions from these datasets are either limited to the salient objects of the images, or tend to broadly depict the entire visual scene. A picture is worth a thousand words, and these holistic image descriptions are far from a complete visual understanding of the image. Furthermore, giving one description for an entire image can sometimes be quite subjective, making the evaluation of captioning ambiguous.

A recent proposal was to use a dense description of image regions as a better interpretation of the visual content, known as dense captioning. With this approach, human annotators are required to exhaustively label bounding boxes as well as their descriptions (usually a short phrase). Compared to global image descriptions, dense local descriptions are more objective and less affected by annotator preference. The local descriptions provide a rich and dense semantic labeling of the visual elements, which can benefit other tasks such as semantic segmentation and visual question answering. For convenience, the image regions associated with local descriptions are referred to as regions of interest (or ROI) in the remaining text.

For dense captioning, an end-to-end neural network may be used to predict descriptions based on region proposals generated by a region proposal network. For each region proposal, the network produces three elements separately: a foreground probability (similar to a detection score in object detection), a phrase to describe the content, and a bounding box offset. One difference that dense captioning has from traditional object detection is that it has an open set of targets, which are not limited to valid objects, but also include parts of objects and multi-object interactions. Because of this, two types of challenges emerge when predicting the regional captions.

Figure 5:
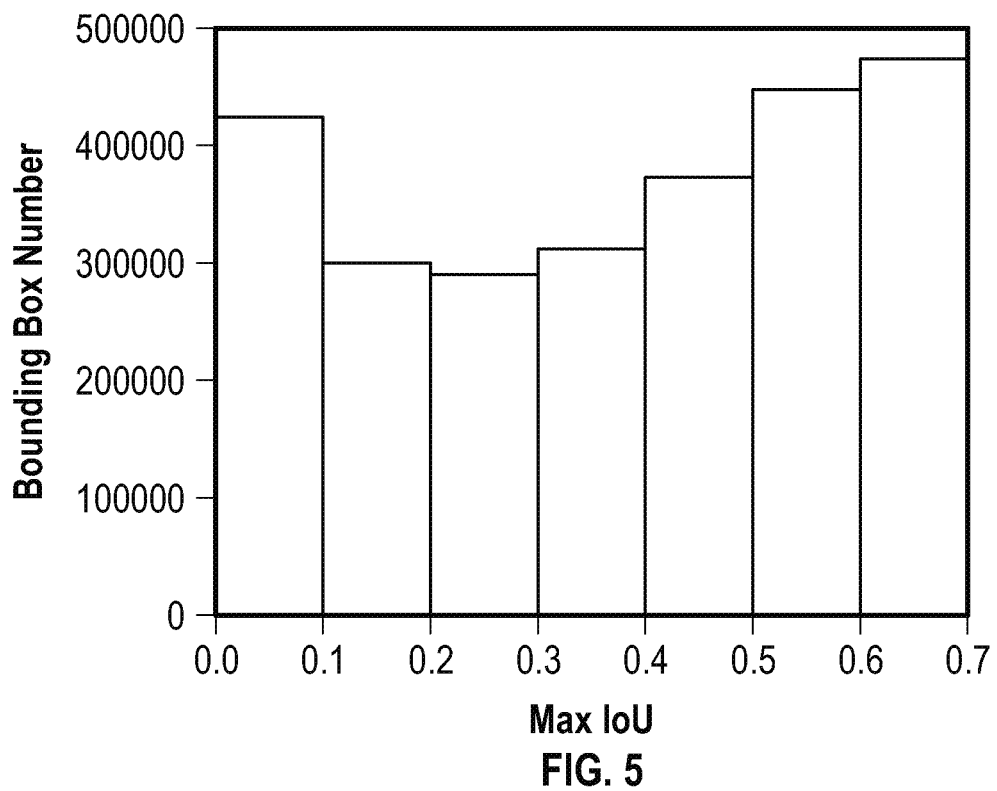
FIG. 5 illustrates statistics of the maximum Intersection-over-Union (IoU) between ground truth bounding boxes, according to some example embodiments.
Figure 6:
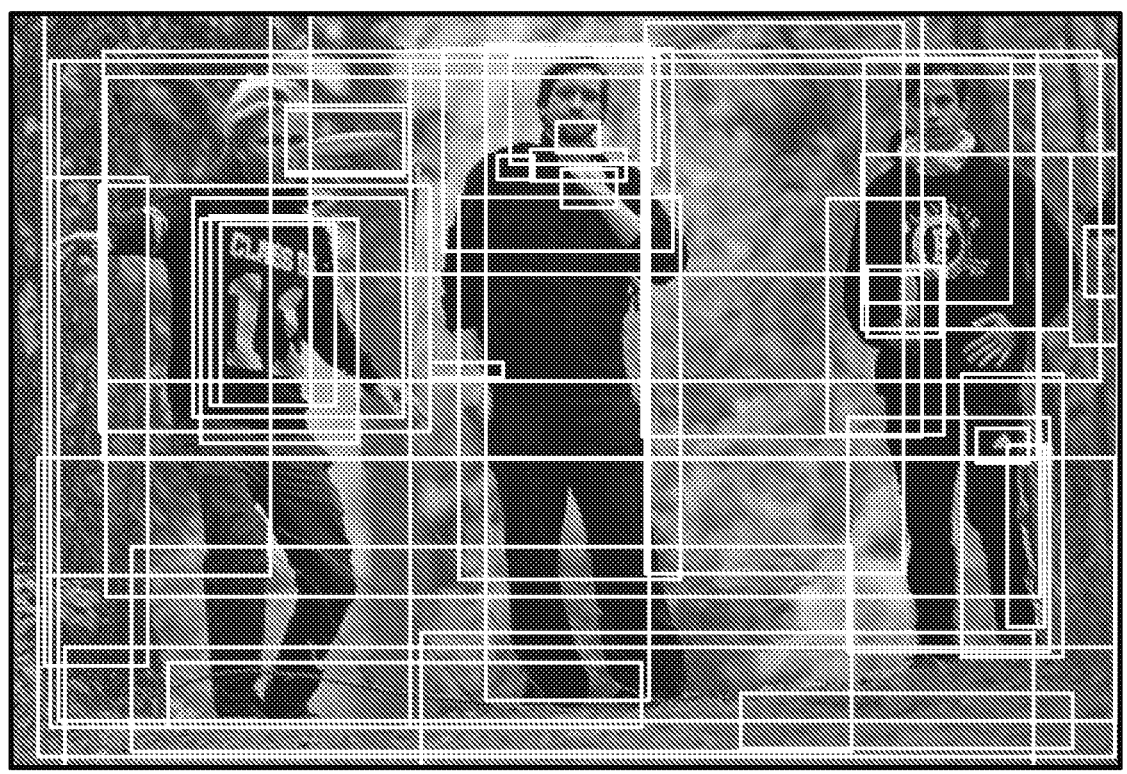
FIG. 6 shows an image overlaid with ground truth bounding boxes, according to some example embodiments.

First, the target bounding boxes become much denser than object detection with limited categories (e.g., 20 categories for PASCAL VOC). Take the Visual Genome dataset as an example. The statistics of the maximum Intersection-over-Union (IoU) between ground truth bounding boxes can be seen in FIG. 5, which shoes that more than half of the bounding boxes have maximum IoU larger than 0.31. FIG. 6 shows an image overlaid with all ground truth bounding boxes. A region proposal can easily have multiple overlapping regions of interest. Therefore, it is necessary to localize a target region (e.g., adjust a bounding box around the target region) with the guidance of the description.

Second, since there are a huge number of visual concepts being described, some of the target regions are visually ambiguous without their contexts. In Visual Genome, the number of different object categories is 18,136, which includes a long list of visually similar object pairs such as "street light" and "pole", "horse" and "donkey", and "chair" and "bench".

Addressing these two challenges may greatly benefit the task of dense captioning. Example embodiments describe a dense captioning model that address the above two problems by introducing two key components.

Figure 7:
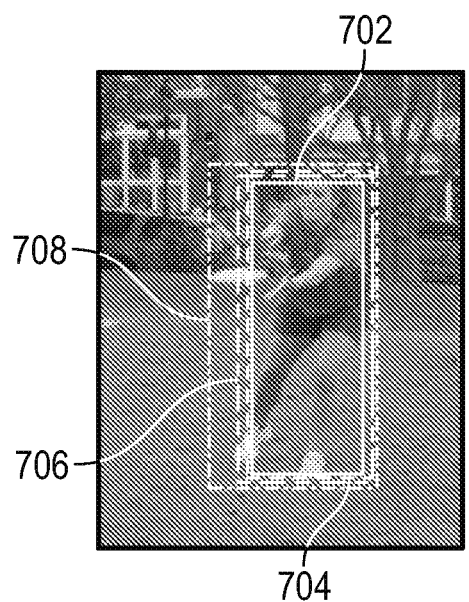
FIG. 7 shows an example of a step-by-step localization process with joint interference, according to some example embodiments.

The first component is joint inference. In joint inference, pooled features from regions of interest are fed into a recurrent neural network to predict region descriptions, and the localization bounding boxes are jointly predicted from the pooled features with recurrent inputs from the predicted descriptions. FIG. 7 shows an example of a step-by-step localization process with joint inference, where the localization bounding box gradually adapts to the accurate position. For example, for a region proposal, the bounding box can be adapted with the caption word by word. In this example, the bounding box is guided by the caption, "woman playing frisbee," to include the frisbee.

Figure 8:
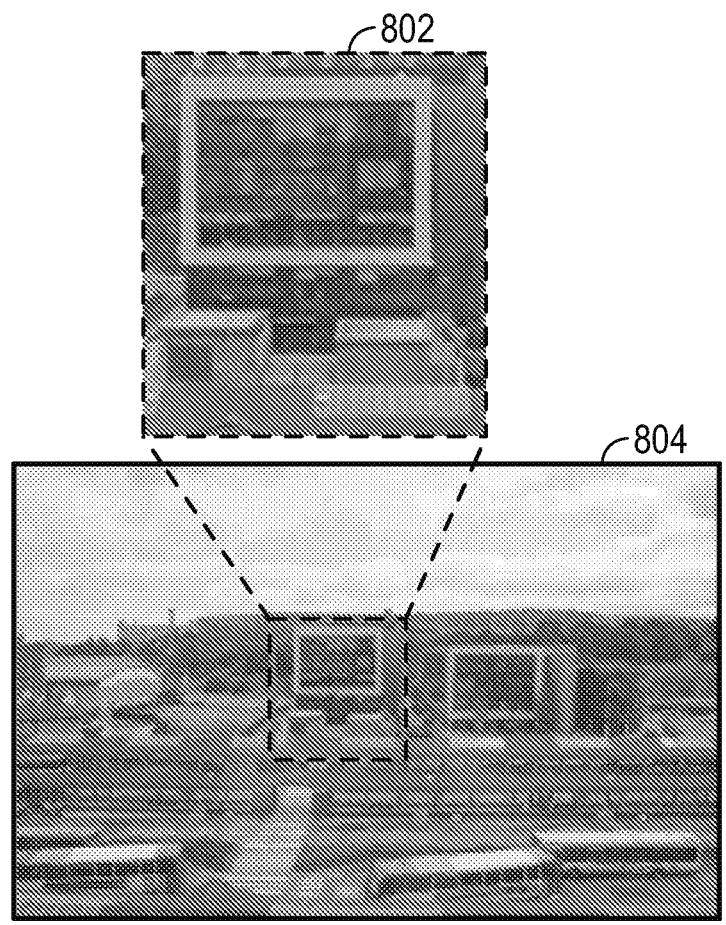
FIG. 8 shows an example image, according to some example embodiments.

The second component is context fusion, where pooled features from regions of interest are combined with context features to predict better region descriptions. An example is shown in FIG. 8, where the object in the bounding box is described as a desktop without visual cues from the surround context. It is ambiguous to select the bounding box without the description. The object in the bounding box is hard to recognize as a building without the context of the whole image.

Several different network structures are described herein to implement the two novel components, and to conduct extensive experiments to explore the benefits and characteristics of each. One example embodiment includes a unified model which achieves a mean average precision (mAP) accuracy of 9.31% on Visual Genome V1.0. This is a relative gain of 73% over the previous state-of-the-art approach. Quantitative experiments were conducted to explore the strengths and weaknesses of the unified model. Through these methods a compact and effective model with state-of-the-art performance is obtained.

Image captioning and object detection are related topics to dense captioning. The recent image captioning models often utilize a convolutional neural network (CNN) as an image encoder and a recurrent neural network (RNN) as a decoder for predicting a sentence. RNNs have been widely used in language modeling. Some image captioning approaches, though targeted at a global description, also build relationships with local visual elements. For example, one approach learns an embedding with a latent alignment between image regions and word phrases. Another approach first detects words from images using multiple instance learning, then incorporates the words in a maximum entropy language model. A soft-attention mechanism has also been proposed to cast attention over different image regions when predicting each word.

Recent object detection algorithms based on deep learning often show a two-stage paradigm: region proposal and detection. Faster R-CNN utilizes a Region Proposal Network (RPN) to generate region proposals and a detection network to predict object categories and bounding box offsets. The two networks can share convolutional features and faster training with an approximate joint training algorithm. A recent improvement to faster R-CNN is the incorporation of context information using a four-direction RNN on the convolutional feature map. Visual context can greatly help tasks such as object detection and semantic segmentation. Another direction is to remove the RPN and directly produce the detection results to further speed up the algorithm.

The task of dense captioning was first proposed using a spatial transformer network to facilitate joint training of the whole network. A related application was also proposed to detect an arbitrary phrase in images using the dense captioning model. Experiments for these proposals were conducted on the Visual Genome dataset, which provides not only region descriptions but also objects, attributes, question answering pairs, and so forth. Some recent approaches also target closely related topics, such as localizing a phrase in a specific image, or generating an unambiguous description for a specific region in an image.

Dense captioning is similar to object detection in that it also needs to localize the regions of interest in an image, but differs in that it replaces the fixed number of object categories with a much larger set of visual concepts described by phrases. Some successful recipes from the object detection literature may be leveraged in designing a dense captioning algorithm. The example dense captioning model pipeline described herein is inspired by the efficient faster RCNN framework.

FIG. 1 illustrates a dense captioning system 100, according to one example embodiment. The dense captioning system includes a region detection network 102 adopted from faster R-CNN and a localization and captioning network 104. The region detection network 102 may comprise a feature map generation module 106, a region proposal module 108, a region feature module 110, and a context feature module 112. The localization and captioning network 104 may comprise a detections scores module 114, a localization module 116, a captioning module 118 and output captions 122 and bounding boxes 120.

The dense captioning system 100 directly combines the faster R-CNN framework for region detection and LSTM for captioning, as explained in further detail below. Faster R-CNN uses a two-stage neural network to detect objects based on the image feature maps, which may be generated by a fully convolutional neural network. In the first stage, the network uses a RPN to generate region proposals that are highly likely to be the regions of interest, then generates fixed-length feature vectors for each region proposal using Region-Of-Interest (ROI) pooling layers. In the second stage, the feature vectors are fed into another network to predict object categories as well as the bounding box offsets. Since the gradients cannot be propagated through the proposal coordinates, exact joint training is not viable for faster R-CNN. Instead, it can be trained by updating parameters with gradients from the RPN or the final prediction network alternatively, or by approximate joint training which updates the parameters with gradients from the two parts jointly.

Figure 9:
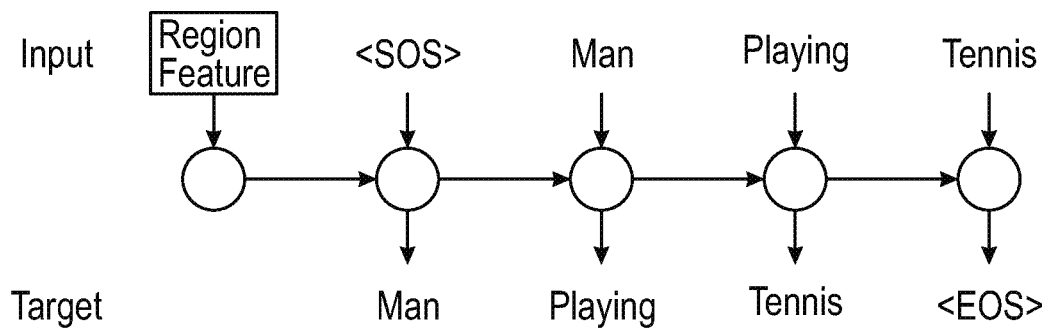
FIG. 9 is a diagram illustrating the unrolled LSTM for region captioning, according to some example embodiments.

The dense captioning system may directly use the proposal detection network (e.g., region detection network 102) from faster R-CNN in the first stage. In the second stage of localization and captioning (e.g., via localization and captioning network 104), the pooled feature vectors are used to produce detection scores, bounding box offsets, and also fed into an LSTM to produce region descriptions (e.g., see FIG. 10). The structure of VGG-16, which is a specific neural network with 16 convolutional layers, is used for the convolutional layers, which generates feature maps 16× smaller than the input image. However, any neural network with convolutional layers may be used for feature map generation. Following faster R-CNN, pretrained weights from the ImageNet Classification challenge are used. The region feature is only fed into the LSTM at the first time step, followed by a special start-of-sentence token, and then embedded feature vectors of the words in the predicted region description. An illustration of the captioning process can be seen in FIG. 9. FIG. 9 shows an illustration of the unrolled LSTM for region captioning, where <SOS> and <EOS> denote the start-of-sentence and the end-of-sentence, respectively.

Instead of other models which replace the ROI pooling layer with a bilinear interpolation module so that gradients can be propagated through bounding box coordinates, the dense captioning system 100 uses approximate joint training that is proven to be effective for object detection and instance-level semantic segmentation. In experiments conducted, the dense captioning system 100 with approximate joint training, is very effective and outperforms the previous state-of-the-art method. A potential reason is that although bilinear interpolation allows for exact end-to-end training, the gradients propagated through the box coordinates are noisy, making the model hard to train.

Figure 2:
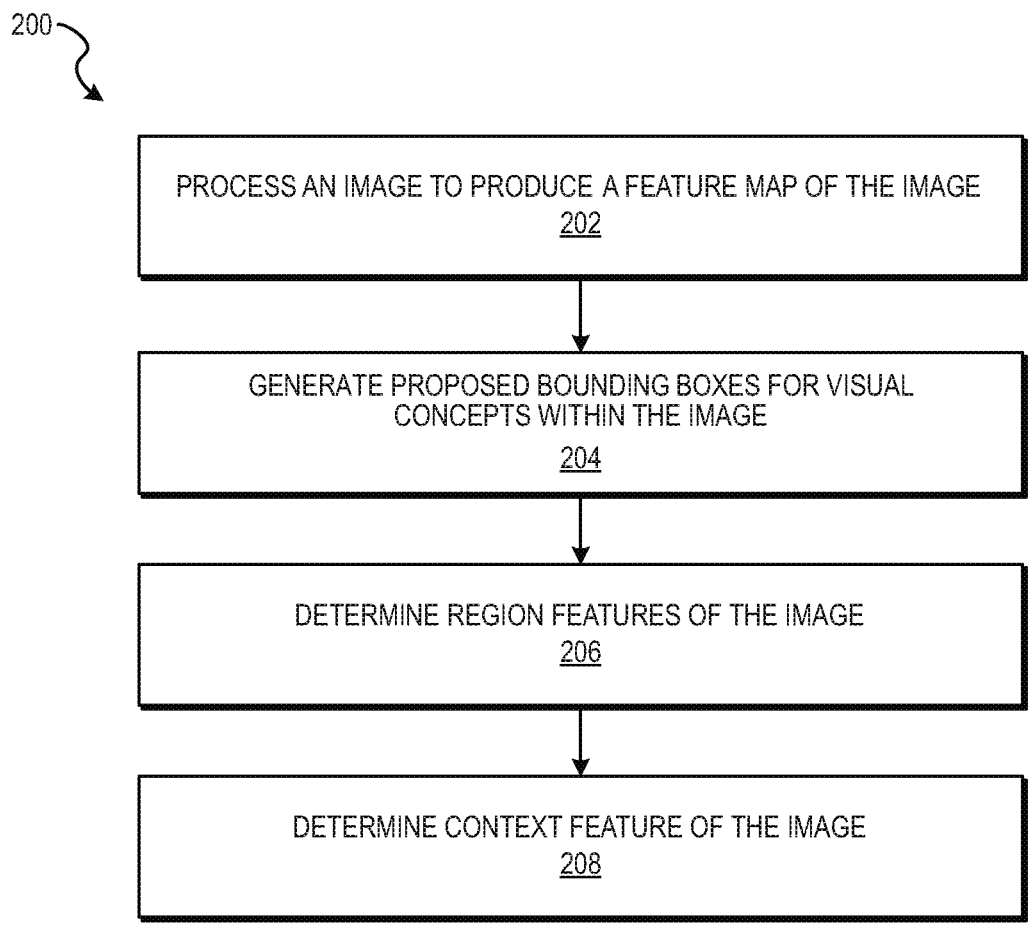
FIG. 2 is a flowchart illustrating aspects of a method, according to some example embodiments.

FIG. 2 is a flow chart illustrating aspects of a method 200, according to some example embodiments, for operations performed by the region detection network 102. For illustrative purposes, method 200 is described with respect to the dense captioning system 100 of FIG. 1. It is to be understood that method 200 may be practiced with other system configurations in other embodiments.

In operation 202, the dense captioning system (e.g., comprising one or more processors) processes an image to produce a feature map of the image. For example, the region detection network 102 comprises a feature map generation module 106 configured to generate a feature map of an image. In one example, the computing system associated with the dense captioning framework 100 receives an image input and outputs a feature map of the image via the feature map generation module 106. The feature map may be produced using a fully convolutional neural network.

The fully convolutional neural network may consist of several different layers, including but not limited to a convolution layer, a pooling layer, and a rectified-linear layer. These layers are stacked together, which means that they perform an operation on the output of the previous layer, starting from the image itself. The output of each layer can also be called features.

The convolution layer applies a bank of filters with learnable parameters to the output of the previous layer. The pooling layer computes a maximum value or an average value for every local window of the previous features. The pooling layer will reduce the spatial size of the previous features. The rectified-linear layer thresholds values of previous features to be above 0. The rectified-linear layer acts as the nonlinear operation in the neural network and can increase the expressive power of the network. There are often multiple of each type of layers in one fully convolutional network. After processing by all of these layers, the output of the last layer is the feature map.

In operation 204, the computing system analyzes the feature map to generate proposed bounding boxes for a plurality of visual concepts within the image. For example, the region detection network 102 may further comprise a region proposal module 108 configured to generate proposed bounding boxes for a plurality of visual concepts within an image. The proposed bounding boxes may be generated using a region proposal network (RPN) to predict visual concept locations and generate bounding boxes around regions that have a confidence of enclosing some visual concepts in the image. The region proposal module 108 may generate proposed bounding boxes for all of the possible visual concepts in the image.

In operation 206, the dense captioning system 100 analyzes the feature map to determine region features for the image. For example, the region detection network 102 may further comprise a region features module 110 configured to determine region features for an image.

In one example, the region features module 110 may use the proposed bounding boxes generated by the region proposal module 108 to crop a region from the feature map for each bounding box. Each cropped region undergoes some operation to generate a region feature. Since the bounding boxes may be different sizes (e.g., with different spatial dimensions), in one example, ROI pooling technology may be used to make sure the spatial dimensions of the region feature are the same for all of the bounding boxes. ROI pooling is a resampling operation conducted on each cropped region of the feature map to produce a fixed-size output. In one example, input size may be 3×4×C, 4×8×C, or 4×1×C and the output size may all be 7×7×C. C is the number of channels of the feature map and 7×7 is a typical output size for ROI pooling. Accordingly, the region features module 110 may do ROI pooling on each cropped region to generate a region feature with the same spatial dimensions.

In operation 208, the dense captioning system 100 analyzes the feature map to determine a context feature for the image. For example, the region detection network 102 may further comprise a context feature module 112 configured to determine a context feature for the image. The context feature module 112 uses the largest possible bounding box to determine a content feature. For example, the context feature module 112 uses the entire feature map (e.g., the entire image). As in the region features module 108 described above, the context feature module 112 also uses ROI pooling technology for the context feature. In one example, the size of the feature map may be 13×16×C, and after the ROI pooling, the output will have size of 7×7×C. Other sample technologies may also be used to generate context feature, such as a linear transformation, a global average pooling (e.g., average operation across the whole feature map), weighted average pooling (e.g., weighted average operation across the feature map), and so forth.

Figure 3:
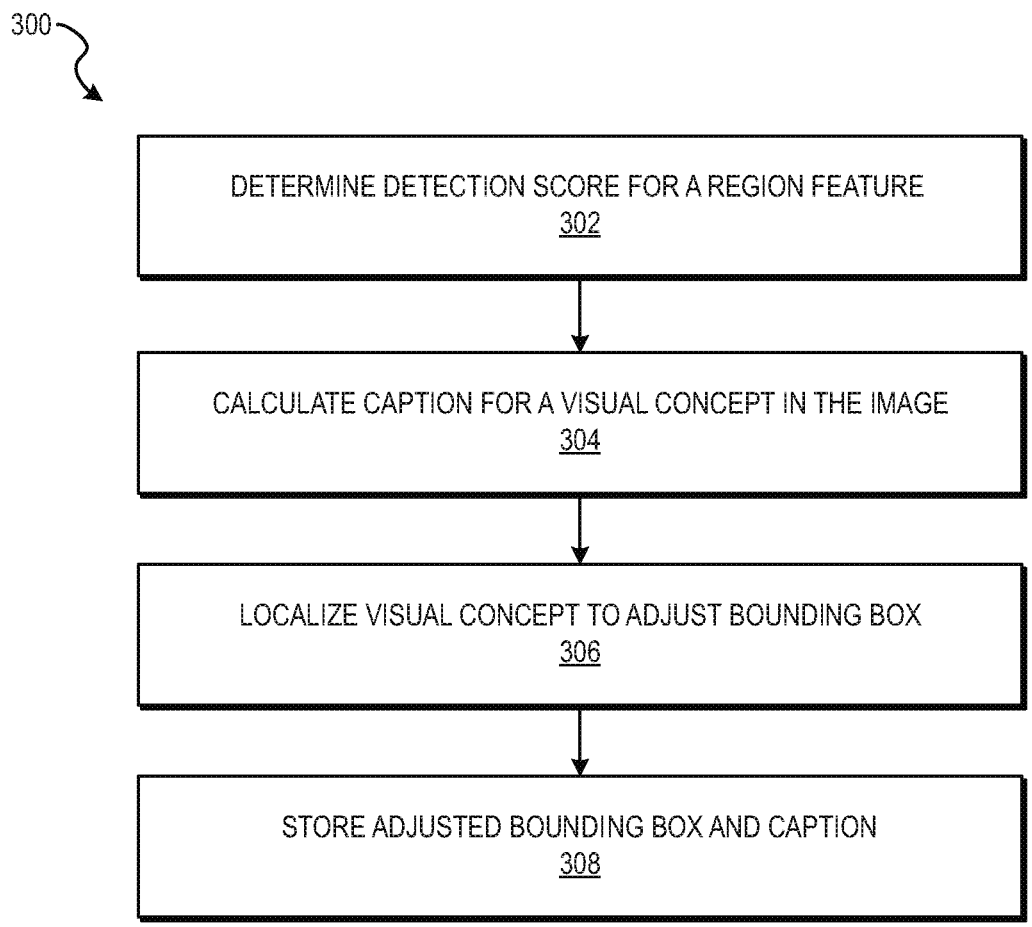
FIG. 3 is a flowchart illustrating aspects of a method, according to some example embodiments.

FIG. 3 is a flow chart illustrating aspects of a method 300, according to some example embodiments, for operations performed by the localization and captioning network 104. For illustrative purposes, method 300 is described with respect to the dense captioning system 100 of FIG. 1. It is to be understood that method 300 may be practiced with other system configurations in other embodiments.

Localization and captioning is performed for each region feature of the image. In operation 302, the dense captioning system 100 analyzes a region feature (e.g., a first region feature of a plurality of region features) to determine a detection score for the region feature. For example, the localization and captioning network 104 may comprise a detection scores module 114 configured to determine a detection score for each region feature. The detection score indicates how likely the region feature is an actual object. For example, a higher detection score may indicate a higher likelihood that the region feature is an actual object, and a lower detection score may indicate a lower likelihood that the region feature is an actual object. Embodiments described herein may use a threshold value whereby region features with a detection score below a threshold value may be discarded and thus, only region features above the threshold value will be kept. Some example technologies to use for determining a detection score include a weighted sum of the values in the region feature, a neural network, a Support Vector Machine (SVM), and so forth.

In operation 304, the computing system calculates a caption for a bounding box for a visual concept in the image using the region feature and the context feature. For example, the localization and captioning network 104 may further comprise a captioning module 118 configured to calculate captions 122 for bounding boxes for visual concepts in the image using the region feature and a context feature. The captioning module 118 may generate a caption for each region feature of the image. The caption module 118 may also use the context feature generated by the context feature module 112 to generate a caption for each region feature of the image to generate a more accurate caption. For example, FIG. 8 shows an image 802 of a desktop computer. Out of context of the entire image 804, the caption generated may be "desktop computer." With the context of the entire image 804, however, it is clear that it is not a desktop computer, but instead a modern building. Using the context the captioning module may determine that the region feature is a modern building and not a desktop computer. These captions may be fed into the localization module 116 as described in further detail below.

In operation 306, the dense captioning system 100 localizes the visual concept to adjust the bounding box around the visual concept. For example, the localization and captioning network 104 may further comprise s localization module 116 configured to localize the true visual concept of a region feature by adjusting the bounding box to be more accurate. The boundary box may be adjusted based on the caption calculated by the captioning module 118. The adjusted bounding box is also referred to herein as a bounding box offset. The output of the localization module 116 is an adjusted bounding box 120 for each region feature.

In operation 308, the dense captioning system 100 stores the adjusted bounding box and caption.

Figure 4:
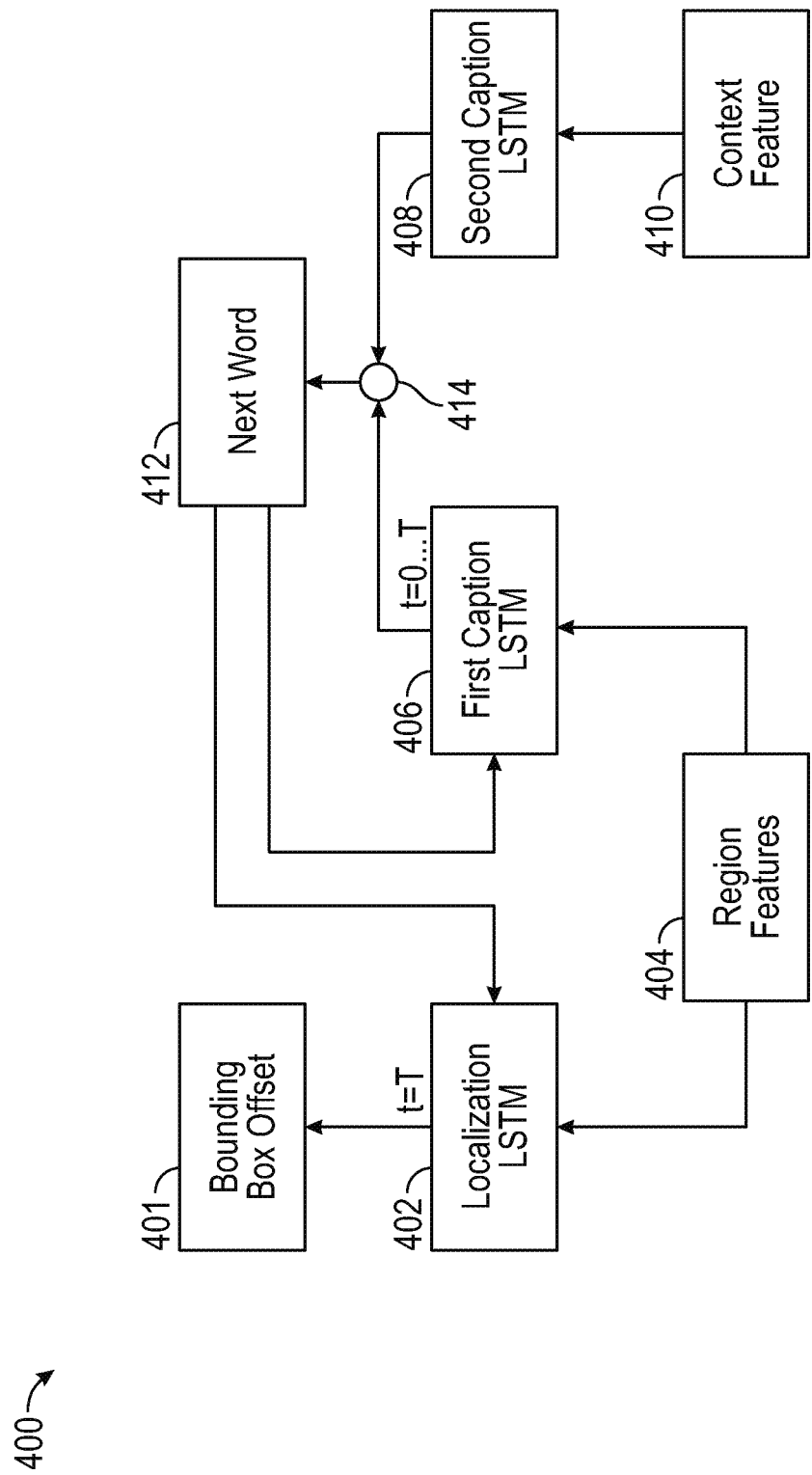
FIG. 4 is a block diagram illustrating an integrated model of a two-LSTM and late-fusion context model, according to some example embodiments.

FIG. 4 illustrates an integrated model 400 of a two-LSTM (long short-term memory) and a late-fusion context model, according to an example embodiment. This integrated model includes further detail on an example embodiment for the localization and captioning network 104. In FIG. 4, the localization LSTM 402 corresponds to the localization module 116 of FIG. 1 and the first caption LSTM 406 and the second caption LSTM 408 correspond to the captioning module 118 of FIG. 1. For example, the localization module 116 may comprise one LSTM and the captioning module 118 may comprise two LSTMs. For illustrative purposes, LSTMs are shown in FIG. 4 and described herein. It is understood, however, that other technology may be used in place of the LSTMs. For example, any neural networks that take sequential input may be used in place of the LSTMs.

The first caption LSTM 406 takes each region feature 404 as an input. The second caption LSTM 408 takes the context feature 410 (also referred to as a "global feature" herein) as an input. The hidden states (e.g., typically a list of floating numbers) from the first caption LSTM 406 and the hidden states from the second caption LSTM are then fed to the fusion operator 414 to generate a fused representation (e.g., a list of floating numbers). The fused representation is operated by a linear transformation to get the scores for each word. The word with the highest score is picked as the first word. The fusion operator can be any function taking two vectors as input and producing another vector as output. For example, the fusion operation may be element-wise summation, element-wise multiplication, concatenation, and so forth.

The first word is then fed back into the first caption LSTM 406 and used to generate the next word for the region feature. The first word is also fed into the localization LSTM 402. The next word is fed into the fusion operator 414 along with the word representing the context feature 410 from the second caption 408 and the next word is generated. The next word is fed back into the first caption LSTM 406 and used to generate the next word for the region feature. The next word is also fed into the localization LSTM 402. In this way, each word of the caption is generated until the end of sentence is determined. The localization LSTM 402 uses the full caption or description (e.g., the full sentence) to determine the bounding box offset 401 (e.g., the adjusted bounding box).

Using the example shown in FIG. 7, the proposed bounding box may be the smallest bounding box 702 just surrounding the woman. The bounding box may be adapted with the caption word by word. For example, for the first word "woman" generated by the captioning module 118 that is fed into the localization module 116 via the localization LSTM 402, the localization module adjusts the bounding box 702 to be slightly larger bounding box 704 to better capture the word "woman." For the next word "playing" generated by the captioning module 118 that is fed into the localization module 116 via the localization LSTM 402, the localization module adjusts the bounding box 704 to be a slightly larger bounding box 706 to better capture the word "playing." For the next word "frisbee" generated by the captioning module 118 that is fed into the localization module 116 via the localization LSTM 402, the localization module adjusts the bounding box 706 to be a slightly larger bounding box 708 to better capture the word "frisbee.". Then the captioning module produce the end-of-sentence token, which means the caption is ended. The bounding box prediction at the last word "frisbee" (e.g., 708) is chosen as the final bounding box prediction Next, different designs for localization and captioning network architectures are described that were designed in the search for an ideal dense captioning framework, such as the one described above. In example embodiments, joint interference is used for accurate localization. In this section, we explore the model design for joint inference between bounding box localization and region description for a given region proposal. Due to the large number of open set phrases and dense bounding boxes, these two may be combined in order to improve both localization and captioning. The first stage of proposal detection (e.g., region detection network 102) remains the same as the baseline model described above. The focus in the following description is on designing a joint localization and captioning network for the second stage (e.g., for the localization and captioning network 104).

Figure 10:
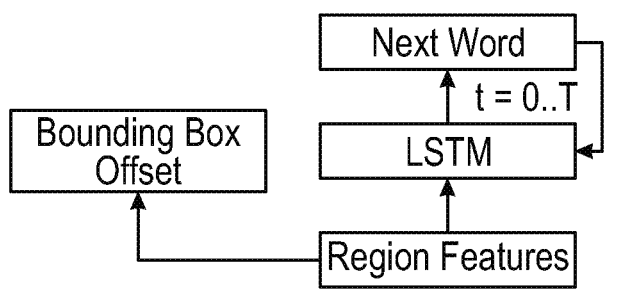
FIGS. 10-13 are block diagrams illustrating designs for joint inference of bounding box offset and region description, according to some example embodiments.

To make the predictor of bounding box offset aware of the semantic information in the associated region, the bounding box offset is made an output of an LSTM encoded with region descriptions. The baseline model is shown in FIG. 10 and several designs for joint inference of bounding box offset and region description are shown in FIGS. 11-13.

Figure 11:
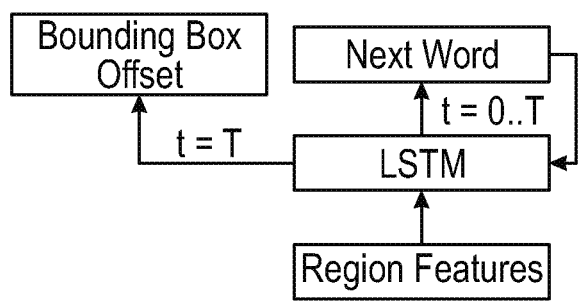
Figure 12:
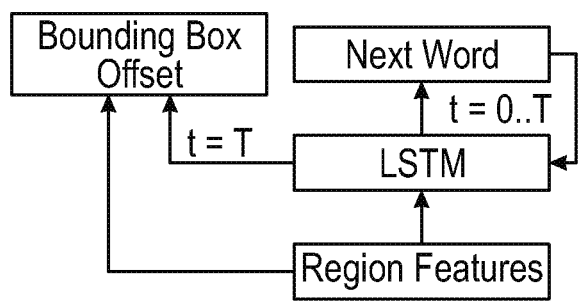

FIG. 11 illustrates One-LSTM which directly uses the existing LSTM to predict the bounding box offset at the last time step of the caption. This model embeds the captioning model and the location information in the same hidden space. FIG. 12 illustrates Joint one-LSTM which concatenates the output of the LSTM and region features to predict the offset, so that the prediction of the offset is guided by the region features.

Figure 13:
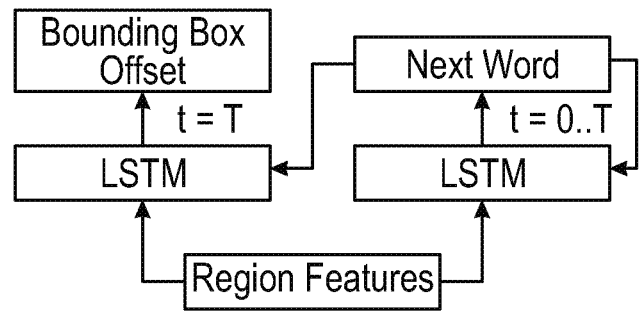

FIG. 13 illustrates Two-LSTM which uses two LSTMs to predict the bounding box offset and description separately. This model separates the embedded hidden space of the captioning model and the location predictor. The two LSTMs are denoted as location-LSTM and caption-LSTM, and both receive the embedded representation of the last predicted word as input. In all three models, the bounding box offset is predicted at the last time step of the description, in which the "next word" is an end-of-sentence tag and the description is finished. Thus, the network is updated with the whole description at the time of predicting the bounding box offset.

Visual context is used to generate an accurate description. Visual context is important for understanding a local region in an image, and it has greatly helped tasks such as object detection and semantic segmentation. Despite the exploration of context features in these tasks, there is limited work on the integration of context features into sequential prediction tasks such as image captioning. In one example embodiment, the goal is to seek the optimal combination of context features and local features in the sequential prediction task of dense captioning, rather than investigating better representations of context information. Thus, a simple but effective implementation of context features, which only utilizes a global pooling feature vector as the visual context, may be used in example embodiments. Since the bounding box offset is less connected with the global feature (also referred to herein as "context feature"), the global feature may only be used to assist caption prediction and observed specifically its effectiveness for region description.

Figure 14:
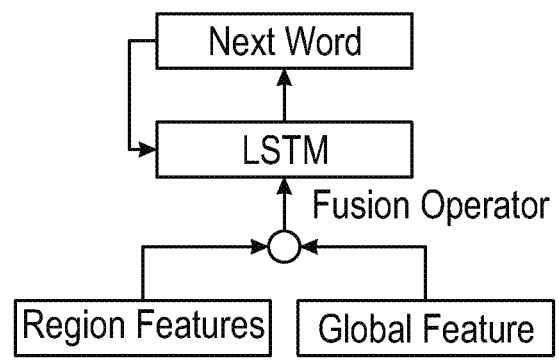
FIGS. 14-15 are block diagrams illustrating structures of region description assisted by a global feature, according to some example embodiments.
Figure 15:
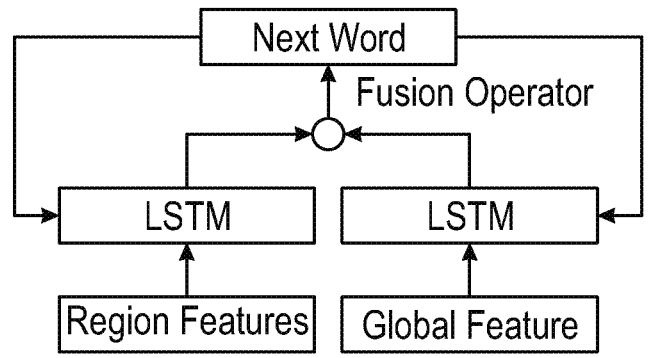

There are different ways to combine the global feature with the local feature in a neural network. Two major variants are described herein, which are shown in FIGS. 14-15. FIGS. 14-15 show structures of region description assisted by a global feature. The first variant shown in FIG. 14 directly combines the region feature and global feature before feeding into the LSTM. The second variant shown in FIG. 15 uses an extra LSTM to generate a recurrent representation of the global feature, then combines it with the local feature. These two types are named as early-fusion and late-fusion respectively. The global feature representation is combined with the regional feature representation via a fusion operator for the both variants. The fusion operator can be concatenation, summation, and multiplication. After each word is selected, its embedded representation is fed into the single LSTM or two LSTMs to guide the generation of the next word. Such designs can be easily integrated with any of the models in FIGS. 10-13.

In order to make the global feature have a similar representation as the region feature, an ROI pooling is used from the whole feature map to generate the global feature. In this way the generation of the global feature does not require extra parameters, keeping the whole model compact.

Figure 16:
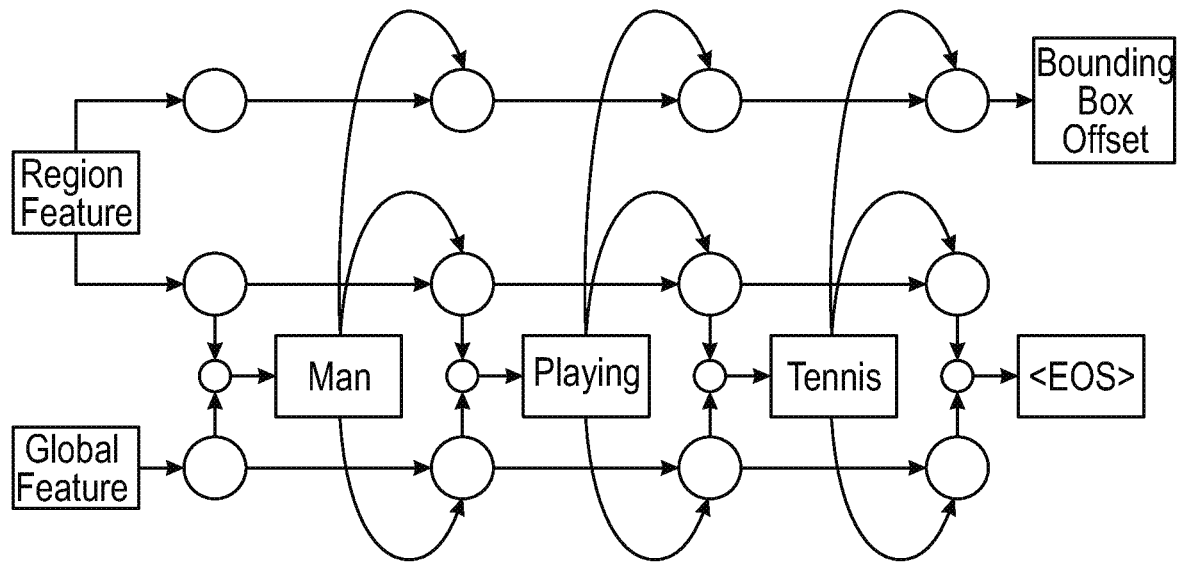
FIG. 16 is a block diagram illustrating an integrated model of a two-LSTM and late-fusion context model, according to some example embodiments.

The joint interference model structure and visual context model structure described above can be plugged together to produce an integrated model. For example, the integration of two-LSTM and the late-fusion context model can be viewed in FIG. 16. FIG. 16 is another representation of the integrated model illustrated in FIG. 4, and described above. In the model shown in FIG. 16 one word is predicted at each time step and the bounding box offset is only predicted at the last time step of the caption, after all words have been encoded into the location-LSTM. Different integrated models are different instantiations of the model pipeline we show in FIG. 1. The characteristics of different models are studied and the learned guidelines to design such models are described in the experiment section below.

Finally, training the dense captioning model is basically minimizing the following loss function L, $L=L_{cap}+\alpha L_{det}+\beta L_{bbox}$; where $L_{cap}$, $L_{det}$, and $L_{bbox}$ denote caption prediction loss, detection loss, and bounding box regression loss, respectively, with $\alpha$ and, $\beta$ the weighing coefficients. $L_{cap}$ is a cross-entropy term for word prediction at each time step of the sequential model, $L_{det}$ is a two-class cross-entropy loss for foreground/background regions, while $L_{bbox}$ is a smoothed-L1 loss. $L_{det}$ and $L_{bbox}$ are computed both in the region proposal network and the final prediction. For those models using an LSTM for predicting bounding box offset, the second $L_{bbox}$ is only calculated at the last timestep of the LSTM output.

For an evaluation dataset, the Visual Genome dataset is used as the evaluation benchmark. Visual Genome has two versions: V1.0 and V1.2. V1.2 is a cleaner version than V1.0, while V1.0 is used by prior models. For comparison purpose, experiments were conducted mainly on V1.0, with additional results introduced on V1.2. The same train/val/test splits as in prior models are used for both V1.0 and V1.2 (e.g., 77398 images for training and 31000 images for validation and test respectively). The same evaluation metric, mean Average Precision (mAP), is used as prior models, which measures localization and description accuracy jointly. Average precision is computed for different IoU thresholds for localization accuracy, and different Meteor score thresholds for language similarity. These are then averaged to produce the mAP score. For localization, IoU thresholds 0.3, 0.4, 0.5, 0.6, 0.7 are used. For language similarity, Meteor score thresholds 0, 0.05, 0.1, 0.15, 0.2, 0.25 are used. A comparison of the dense captioning system 100 with the previous best result can be seen in the table below, which shows a 73% relative gain is achieved compared to the previous best method. This table shows a comparison of the integrated model described above with a previous best result on Visual Genome V1.0 and V1.2.

| Model | Visual Genome V1.0 | | | V1.2 |
| | Previous best method | Integrated model | Gain | Integrated model |
| --- | --- | --- | --- | --- |
| mAP | 5.39 | 9.31 | 73% | 9.96 |

In training, joint training was approximated for all models, which is the same as fast-RCNN. Stochastic gradient descent was used with a mini-batch size of 1 to train the whole network. Input image is resized to have a longer side of 720 pixels. Initial learning rate is 0.001 and momentum is set to 0.98. Learning rate is halved every 100K iterations. Weight decay is not used in training. Fine tuning the CNN layers begins after 200K iterations (~3 epoches) and finish training after 600K iterations (~9 epoches). The first seven convolutional layers are fixed for efficiency. It was found that training models with context fusion from scratch tends not to converge well, so fine-tune these models were from their non-context counterparts, with a total training iterations of 600K. Only descriptions with no more than 10 words were used for efficiency. The most frequent 10000 words were kept as the vocabulary and other words were replaced with an <UNK> tag. For sequential modeling, LSTM with 3112 hidden nodes is used. For the RPN, 12 anchor boxes are used for generating the anchor positions in each cell of feature map. 256 boxes are sampled in each forward pass of training. For the loss function, values of α, β are fixed in (1) to 0.1 and 0.01, respectively.

In evaluation, the settings of the previous best method was followed for fair comparison. First, 300 boxes with the highest predicted confidence after non-maximum suppression (NMS) with IoU ratio 0.7 are generated. Then the corresponding region features are fed into the second stage of the network, which produces detection scores, bounding boxes, and region descriptions. Efficient beam-1 search is used to produce region descriptions, where the word with the highest probability is selected at each time step. With another round of NMS with IoU ratio 0.3, the remaining regions and their descriptions are the final results. In the following sections, first the joint inference models are evaluated, and compared to the baseline model. Then, the integrated models are evaluated using different combinations of the joint inference models and context fusion structures, and compared to the no-context models. The influence of hyperparameters is also explored in evaluation.

The baseline and three joint inference models are evaluated in this section. All of these models are trained end-to-end with the convolutional layers and the RPN. To further clarify the effect of different model designs, experiments were also conducted to evaluate the performance of the models based on same region proposals and image features. Towards this end, the weights of CNN are fixed to those of VGG16 and a hold-out region proposal network also trained on Visual Genome is used based on the fixed CNN weights. The results of the end-to-end trained models and the fixed-CNN&RPN models are shown in the table below. This table shows the mAP performance of baseline and joint interference models on Visual Genome V1.0. The first row is the performance with CN and RPN fixed. The second row is the performance of corresponding models with end-to-end training.

| Model | Previous best method | Baseline | One-LSTM | Joint one-LSTM | Two-LSTM |
| --- | --- | --- | --- | --- | --- |
| Fixed-CNN&RPN | — | 5.26 | 5.15 | 5.57 | 5.64 |
| End-to-end | 5.39 | 6.85 | 6.47 | 6.83 | 8.03 |

It was found that two-LSTM performs best for joint inference. Among the three different structures of joint inference, two-LSTM has the best performance both for end-to-end training (mAP 8.03) and fixed-CNN&RPN training (mAP 31.64). The endto-end model of two-LSTM outperforms the baseline model by more than 1 percent in mAP, while the other three are even worse than the baseline model. By using one LSTM to predict both the caption and the bounding box offset, the language representation and the target location information are unified into a single hidden space. This is quite challenging since they are completely different domains. Even assisted by the original region feature, the one-LSTM solution does not show much improvement. The results show that one-LSTM is on par with baseline (mAP 6.83). By separating the hidden space, for example by using two LSTMs targeted at the two tasks respectively, the model yields much better performance (8.03 vs 6.47). Compared with the baseline model, two-LSTM is better both in localization and captioning.

FIGS. 17-20 show several example predictions of a bounding box and caption from one region proposal for the baseline model and the two-LSTM model. In each image, the three boxes shown include the region proposal 1702, the prediction of the baseline model 1704, and the prediction of the two-LSTM model 1706. The predicted captions are shown in the legends in each figure.

Figure 17:
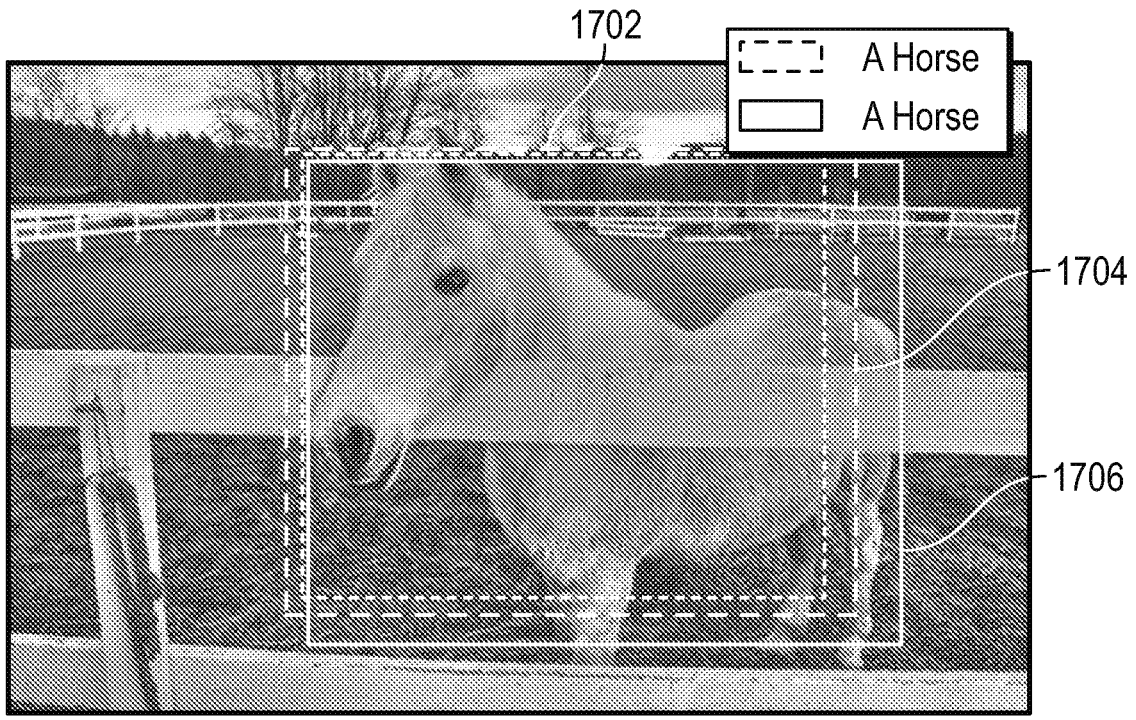
FIGS. 17-20 illustrate example predictions of bounding boxes and captions for various images, according to some example embodiments.
Figure 18:
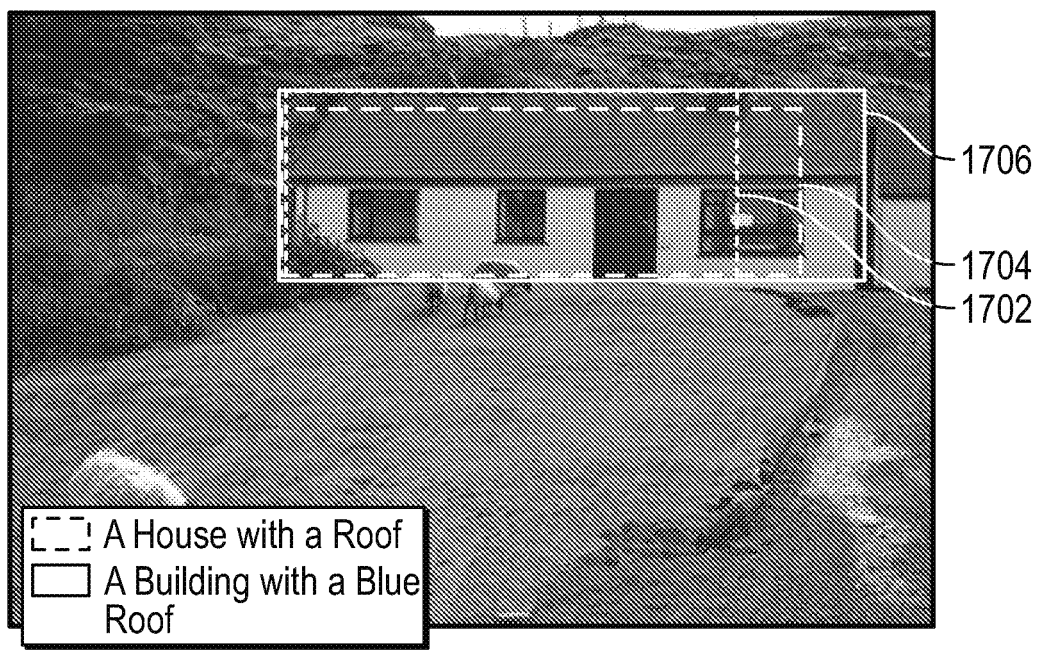
Figure 19:
Figure 20:
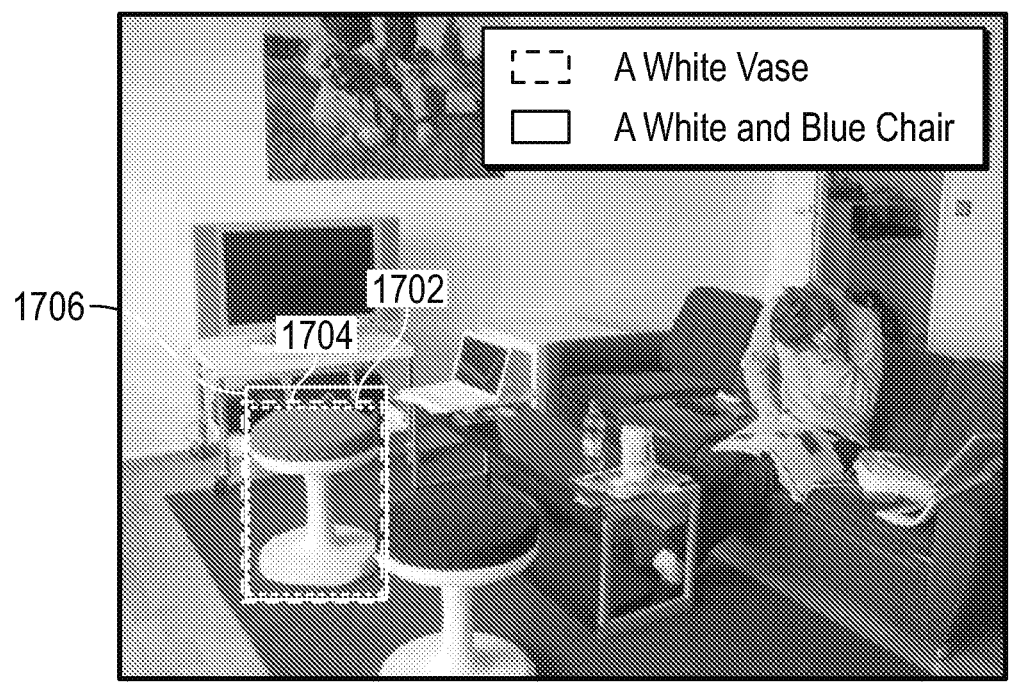

FIGS. 17 and 18 show that two-LSTM improves on localization because of the guidance of the encoded caption information. FIGS. 19 and 20 show two-LSTM is also better at predicting the descriptions, which reveals that location information helps to improve captioning. Although bounding box prediction does not feed information to the captioning process in the forward pass, it does influence captioning through back-propagation in the training stage. Considering all these factors, it is believed that separating the hidden space using two-LSTM is suitable for the joint inference of caption and location.

Next effectiveness of fine tuning CNN layers is discussed. Comparing corresponding end-to-end and fixed-CNN&RPN models, it is observed that all of the models get a performance boost by fine-tuning CNN layers. Among them, two-LSTM gets a relative 42% gain from this procedure. The pre-trained weights are based on a classification task. Thus, desirable features for region descriptions is quite different from those for object classification, which encode the image in dense local representations. Such a representation could also potentially benefit other tasks such as object detection and semantic segmentation, which require detailed local visual representations.

The integrated models were evaluated with different designs for both joint inference and context fusion. For joint inference models, three variants were evaluated: one-LSTM, joint one-LSTM, and two-LSTM. For context fusion, the different settings proposed above are compared. For example, early-fusion and late-fusion are evaluated with different fusion operators: concatenation, summation, and multiplication. For early-fusion with concatenation, a fully-connected layer is plugged in after the concatenated feature to adapt it to the same input dimension of the LSTM. The mAP results of different variants of models are shown in the table below. This table shows mAP performance of integrated models with combinations of joint inference models and context fusion structures on Visual Genome V1.0.

| | model | one-LSTM | joint one-LSTM | two LSTM |
|---|---|---|---|---|
| early-fusion | concatenation | 6.74 | 7.18 | 8.24 |
| | summation | 6.54 | 7.29 | 8.16 |
| | multiplication | 6.69 | 7.04 | 8.19 |
| late-fusion | concatenation | 7.50 | 7.72 | 8.49 |
| | summation | 7.19 | 7.47 | 8.53 |
| | multiplication | 7.57 | 7.64 | 8.60 |

Next, effectiveness of context fusion is discussed. In all the models, context information helps to improve mAP from 0.07 (one-LSTM, early-fusion, summation) to 1.10 (one-LSTM, latefusion, multiplication). The three types of fusion methods (e.g., concatenation, summation, and multiplication), all yield improvements in mAP for different models. Generally, concatenation and multiplication are more effective than summation, but the margin is subtle. It was found that two-LSTM and late fusion with multiplication obtains the best mAP performance 8.60 in this set of experiments. This model is referred to as two-LSTM-mult for brevity in the remaining text.

FIGS. 21-24 shows example predictions for comparison of two-LSTM without context and two-LSTM-mult. In these figures, qualitative comparisons of two-LSTM without context and two-LSTM-mult are illustrated. In each image, the box with the solid line is the prediction of the no-context and the box with the dotted line is the context model. Predicted captions are shown in legends. Region proposals are omitted for clarity.

Figure 21:
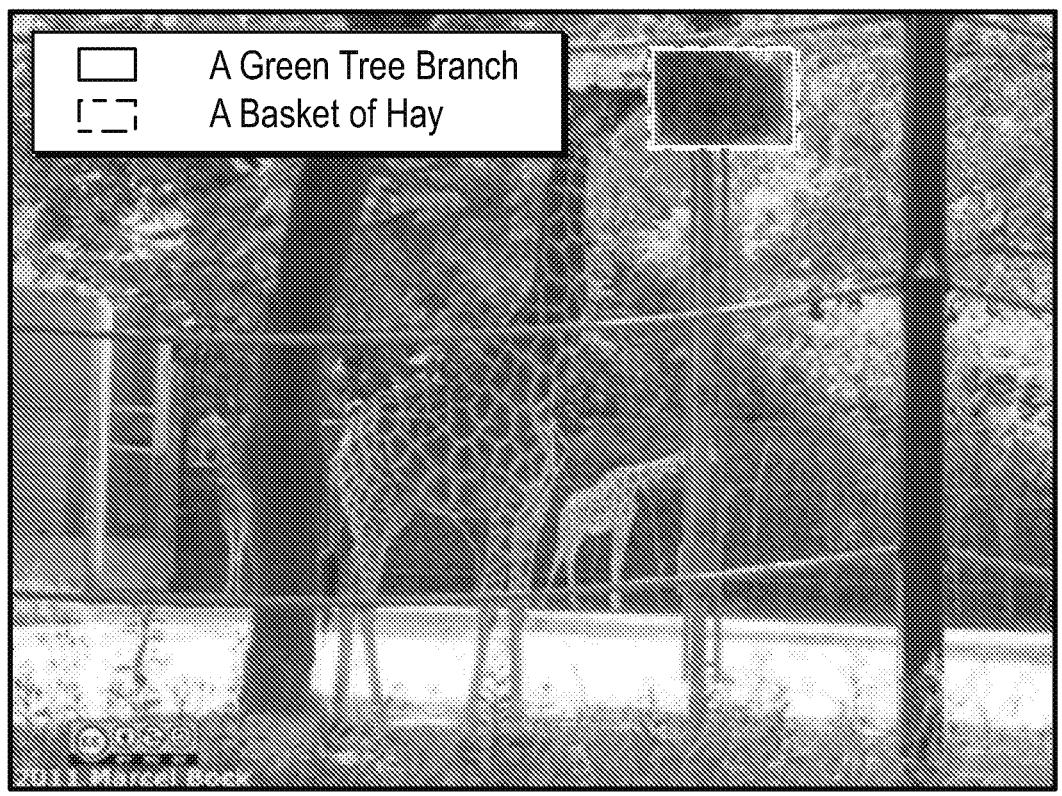
FIGS. 21-24 illustrate example predictions for comparison of two-LSTM without context and two-SLTM-mult, according to some example embodiments.
Figure 22:
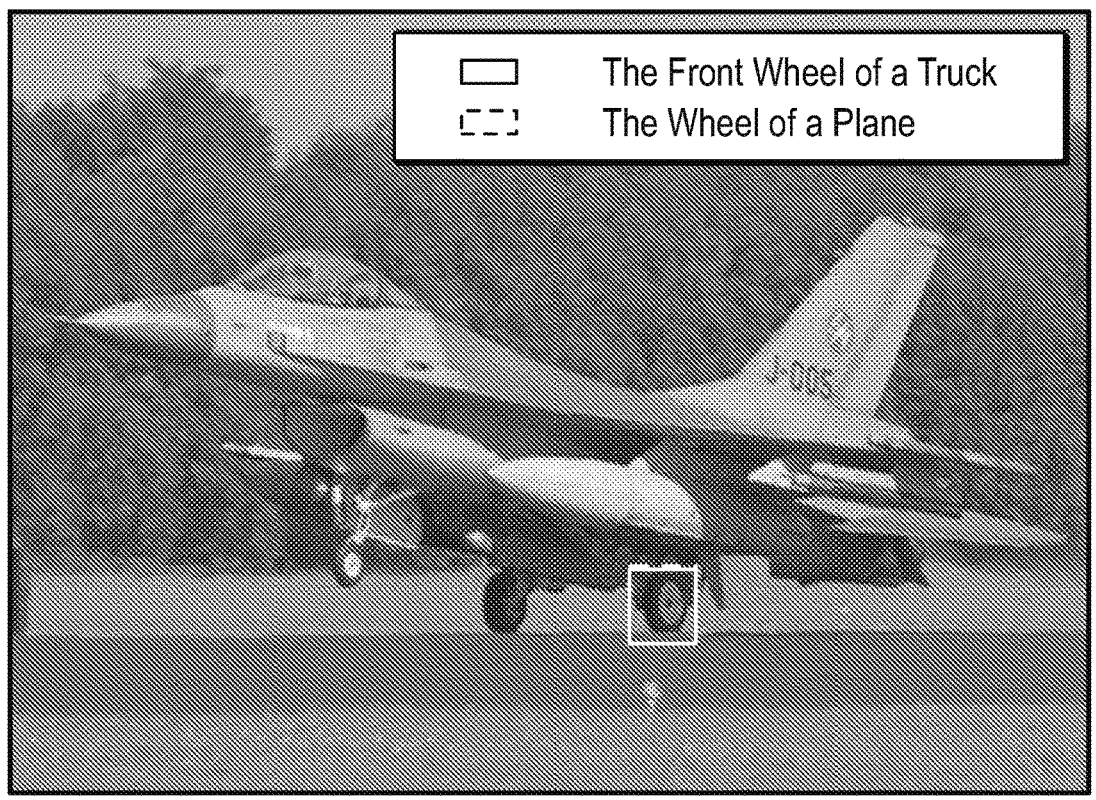
Figure 23:
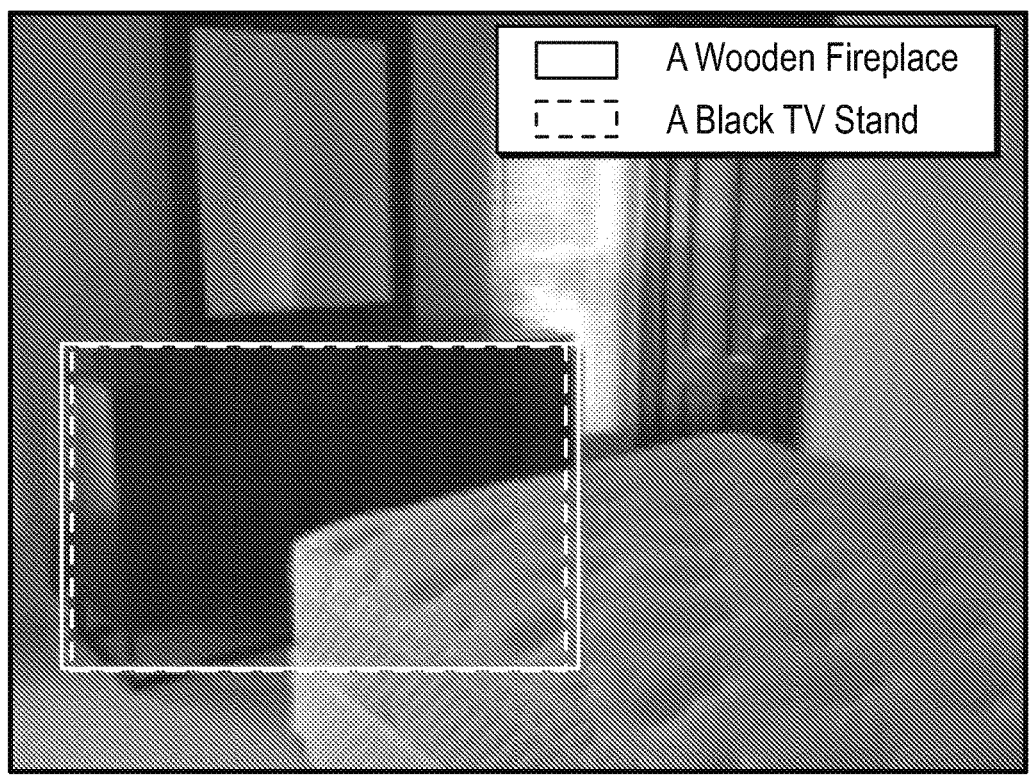
Figure 24:
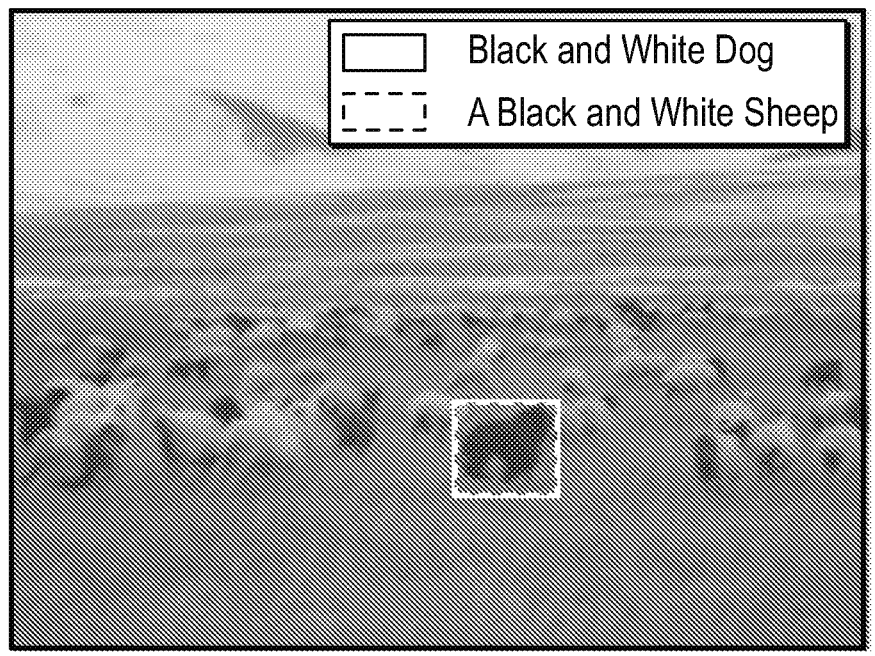
Figure 25:
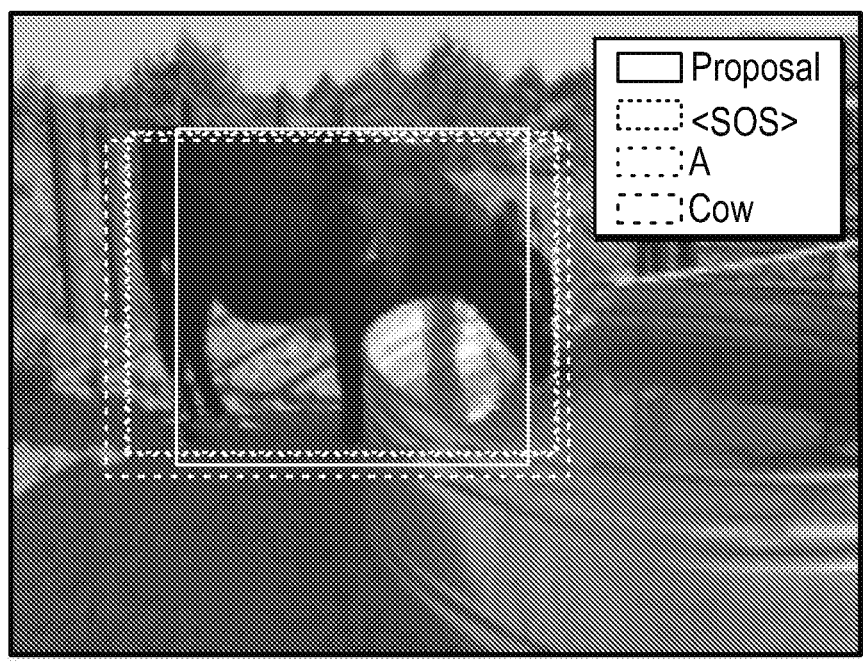
FIGS. 25-28 illustrate examples of predicted bounding box location at different time steps for the two-LSTM-mult model, according to some example embodiments.
Figure 26:
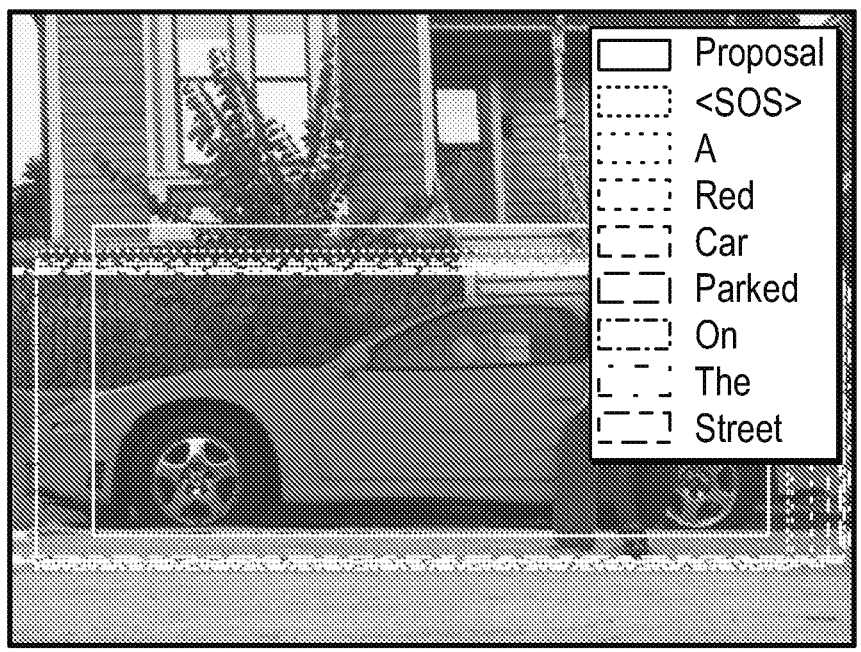
Figure 27:
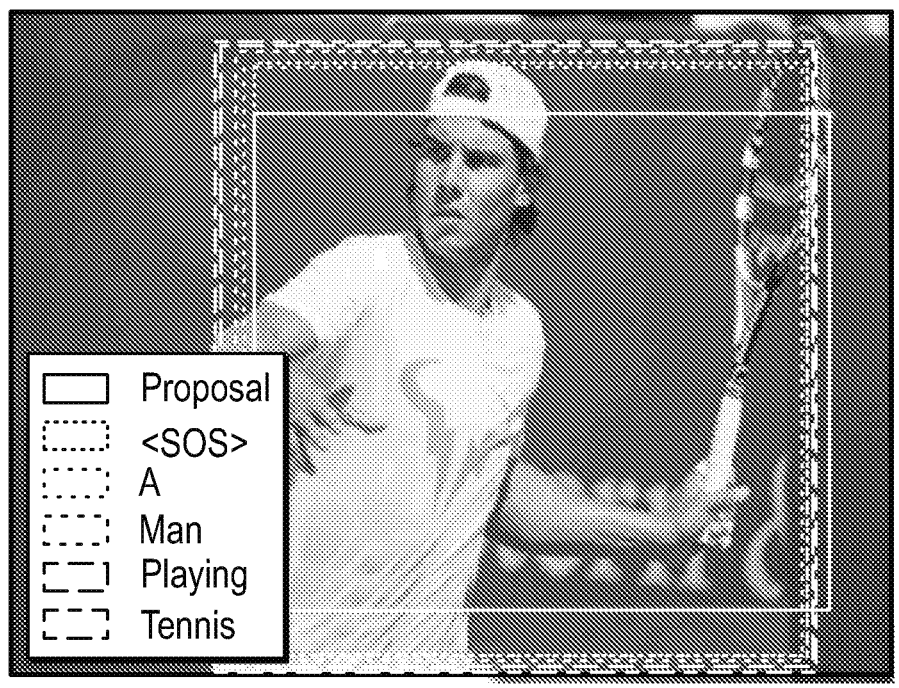
Figure 28:
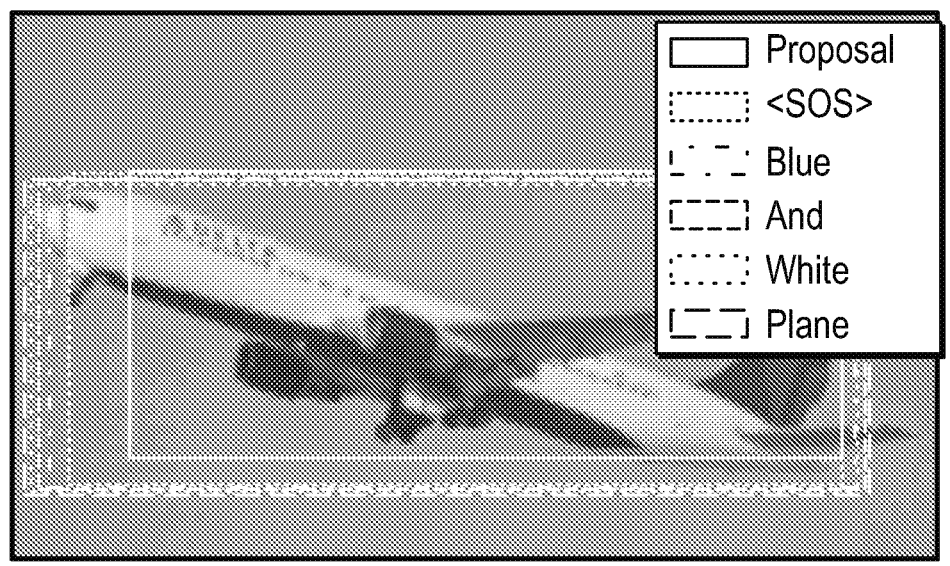

In FIGS. 21-23, two-LSTM-mult gives a better caption than the no-context model. Without context, these objects are very hard to be recognized even by humans. We can also observe from these examples that the context information employed by the model is not limited to the surrounding part of the region proposal, but from the whole image. In FIG. 24, the context model gives an incorrect prediction since it is misled by the context which is full of sheep.

Comparing early-fusion and late-fusion of context information, it is found that late-fusion is better than early-fusion on all pairs of corresponding models. Early fusion only outperforms their no-context counterparts with a small margin. One disadvantage of early-fusion is that it directly combines the local and global feature that can have quite different visual elements, making it unlikely to correlate the visual element to the local region or the context region in the later stages of the model.

Next intermediate location predictions are evaluated. Since the regression target is only added to the last time step of the location-LSTM, it is not clear what the bounding box prediction from the previous time steps will be like. The bounding box predictions from these time steps were tested and found to be good bounding box predictions. FIGS. 25-28 show examples of the predicted bounding box location at different time steps for the two-LSTM-mult model. In each image, different boxes denote the outputs of different time steps. The legend lists the boxes in order of time (from earliest to latest). Corresponding words fed into the location-LSTM are shown as legends. <SOS> is the start-of-sequence token.

Figure 29:
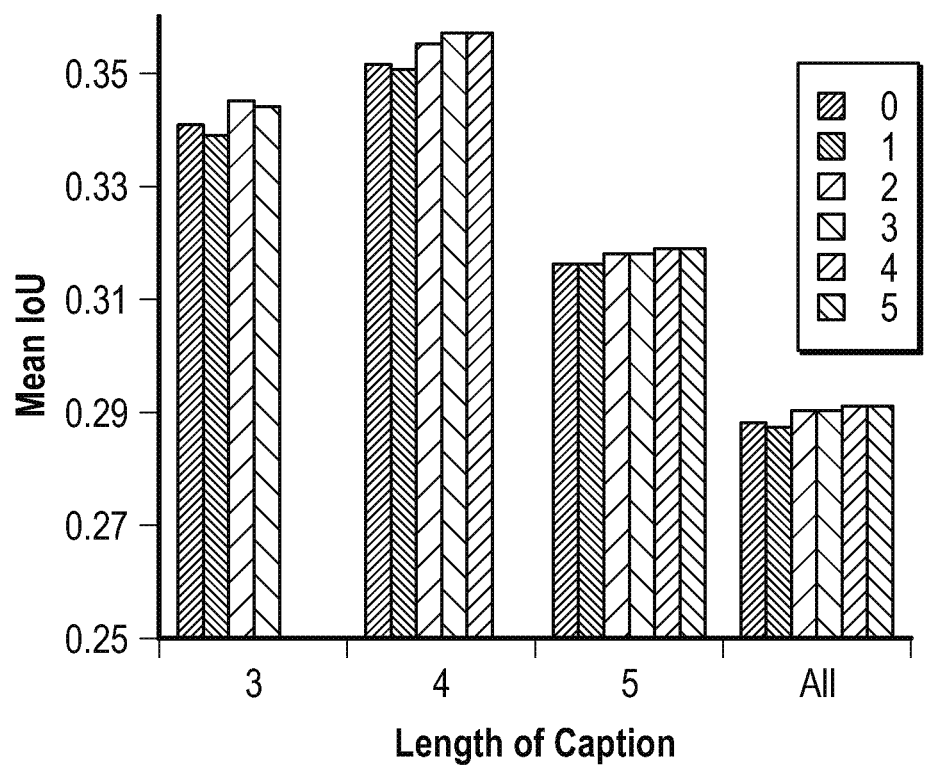
FIG. 29 illustrates mean IoU ratios between predicted boxes and ground truth boxes at different time steps of the caption prediction using two-LSTM-mult, according to some example embodiments.

Generally, the bounding box prediction at the first time step is already close to the region of interest. As words are fed into the location-LSTM, it gradually adjusts the bounding box to a tight localization of the object being described. Employing the two-LSTM-mult model, we calculate the mean IoU ratios between the predicted boxes and the ground truth boxes at different time steps, and also calculate the IoU ratios specifically for predicted captions with length 3, 4, and 5. All of the quantitative results are organized in FIG. 29. FIG. 29 shows mean IoU ratios between predicted boxes and ground truth boxes at different time steps of the caption prediction using two-LSTM-mult. Here, the final bounding box prediction is used when the caption of a region is shorter than the specified time step. We can see that the accuracy of localization gradually improves when time step increases for different lengths of descriptions.

Experiments were also conducted on Visual Genome V1.2 using the same train/val/test split as V1.0. The mAP performances of different dense captioning models on Visual Genome V1.2 are shown in the following table.

| | model | baseline | one-LSTM | two-LSTM |
|---|---|---|---|---|
| no context | | 6.98 | 6.44 | 8.16 |
| Late fusion | concatenation | | 7.76 | 9.03 |
| | summation | | 7.06 | 8.71 |
| | multiplication | | 7.63 | 8.52 |

The results are similar as on V1.0, which shows the advantage of two-LSTM over one-LSTM (8.16 vs 6.44), and that context fusion greatly helps improve performance for both models. For context integration, it can be seen that context fusion with concatenation achieves the best result with mAP 9.03 (denoted as two-LSTM-concat for brevity). Overall, the accuracies are higher than those on Visual Genome V1.0, due to the cleaner ground truth labels.

The evaluation pipeline of dense captioning, which is a two stage process of target prediction (region proposal and region description along with location refinement), involves several hyper-parameters that can influence the accuracy number significantly. These parameters include the number of proposals produced by the RPN and the IoU ratio used by non-maximum suppression (NMS) both in the RPN and the final prediction. For these parameters, the same settings as prior models are used for all evaluations above. However, the impact of these parameters on the result is still in line with our interests. Parameters such as number of proposals is worth investigating since it can be used to find a trade-off between speed and performance. Also, the NMS thresholds used by prior models seem to overly suppress the predicted bounding box, since the ground truth regions are very dense (see, e.g., FIGS. 5-6).

Two-LSTM-mult for is used for Visual Genome V1.0 and two-LSTM-concat is used for V1.2 as prototypes and seek the best hyper-parameters for their evaluation. The parameters with 100 and 300 proposals validated using the validation set were chosen and evaluated on the test set, respectively. The parameters investigated are NMS thresholds for RPN and for final prediction, denoted as NMS r1 and NMS r2, respectively. NMS r1 is chosen from range 0.4~0.9, and NMS r2 is chosen from range 0.3~0.8. The results and corresponding settings are shown in the below table. This table shows the chosen hyper-parameters and the performance on Visual Genome V1.0 and V1.2 respectively.

|      | #proposal | NMS_r1 | NMS_r2 | mAP  |
|------|-----------|--------|--------|------|
| V1.0 | 100       | 0.5    | 0.4    | 8.67 |
|      | 300       | 0.6    | 0.5    | 9.31 |
| V1.2 | 100       | 0.5    | 0.5    | 9.47 |
|      | 300       | 0.6    | 0.5    | 9.96 |

With the validated hyper-parameters, even better mAP performance is achieved with 9.31 on Visual Genome V1.0 and 9.96 on Visual Genome V1.2 using same number of 300 proposals, which sets the new state-of-the-art. With only 100 proposals, the model achieved mAP 8.67 on Visual Genome V1.0 and 9.47 on Visual Genome V1.2, which does not degenerate too much. The running time for a 400×600 image is 350 ms and 200 ms for 300 and 100 proposals on a GTX TITAN GPU, respectively. The implementation is developed by using Caffe.

Embodiments described herein include a novel model structure which incorporates two ideas of joint inference and context fusion, to address specific challenges in dense captioning. To find an exact model realization incorporating these two approaches, the model was designed step by step and different variants proposed for each component. The different models are evaluated extensively, and intuitions gained on the effectiveness of each components and variants. Example embodiments describe a model which utilizes the two approaches effectively and has state-of-the-art performance on the Visual Genome dataset. The feature representation learned by these models can potentially benefit other computer vision tasks requiring dense visual understanding such as object detection, semantic segmentation, and caption localization. The extensive comparison of different model structures conducted may also guide model design in other tasks involving sequential modeling.

Example embodiments described herein may be used in a variety of use cases. For example, example embodiments may be used for searching for particular images, searching for images related to a particular subject, annotation of images, retrieval of images, and so forth. In one example, the dense captioning system 100 may be used in a messaging system for exchanging data (e.g., messages and associated content) over a network. The messaging system may include multiple client devices (e.g., mobile devices, personal computers, etc.), each of which hosts a number of applications including a messaging application. Each messaging application is communicatively coupled to other instances of the messaging application and a messaging server system via a network. For example, a user may use the messaging application on his mobile device to create messages including media data such as text, video, photograph or other images, etc. Technology described in the example embodiments may be used to allow the user to search for images, allow the application to determine a region of interest, and so forth. The example embodiments described herein may reside on the client device (e.g., incorporated into the message application, as a separate standalone technology integrated with one or more applications, etc.), the server system, or a combination of both.

Figure 30:
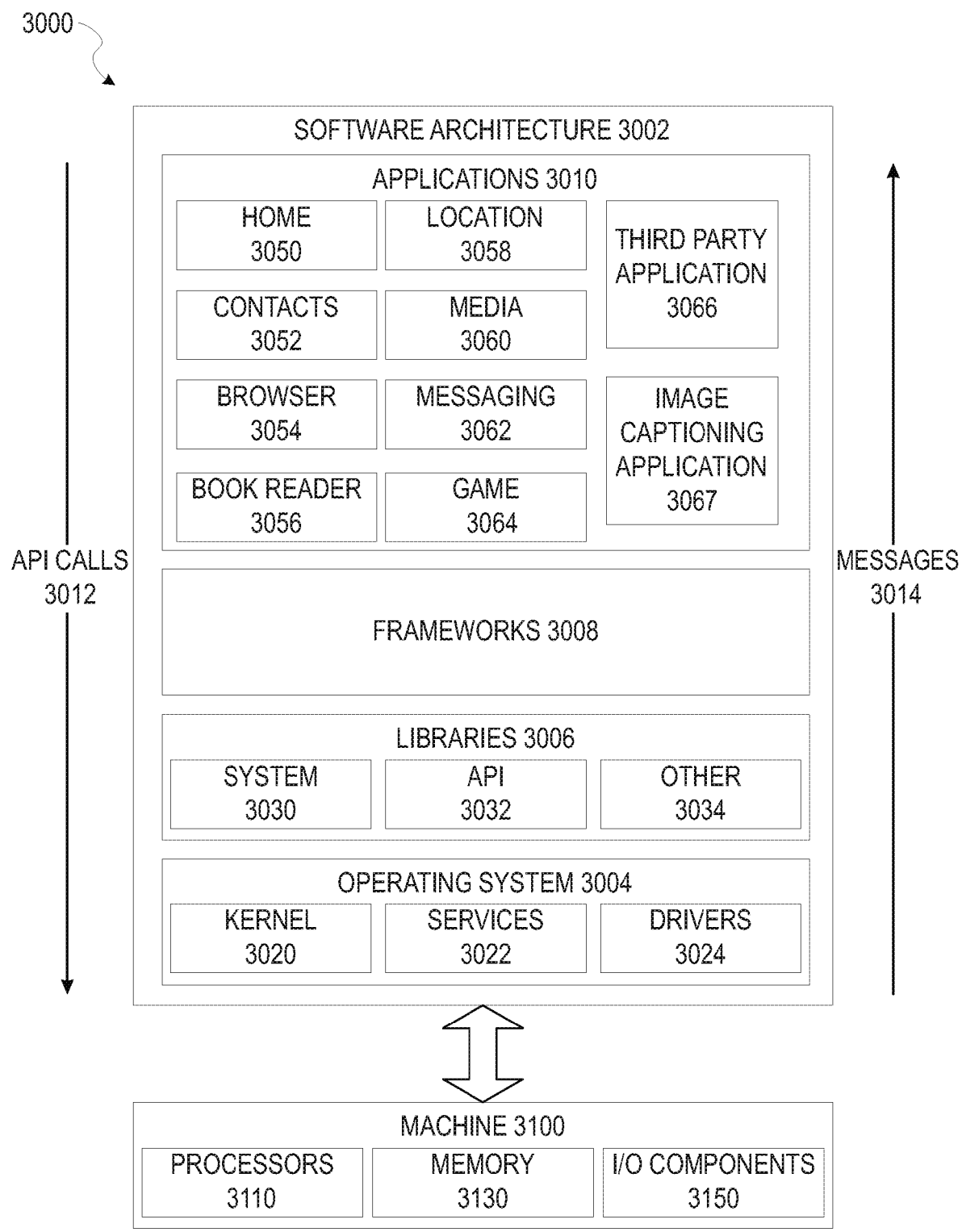
FIG. 30 is a block diagram illustrating an example of a software architecture that may be installed on a machine, according to some example embodiments.

FIG. 30 is a block diagram 3000 illustrating software architecture 3002, which can be installed on any one or more of the devices described above. For example, in various embodiments, dense captioning system 102, client devices, and server systems may be implemented using some or all of the elements of software architecture 3002. FIG. 30 is merely a non-limiting example of a software architecture, and it will be appreciated that many other architectures can be implemented to facilitate the functionality described herein. In various embodiments, the software architecture 3002 is implemented by hardware such as machine 3100 of FIG. 31 that includes processors 3110, memory 3130, and I/O components 3150. In this example, the software architecture 3002 can be conceptualized as a stack of layers where each layer may provide a particular functionality. For example, the software architecture 3002 includes layers such as an operating system 3004, libraries 3006, frameworks 3008, and applications 3010. Operationally, the applications 3010 invoke application programming interface (API) calls 3012 through the software stack and receive messages 3014 in response to the API calls 3012, consistent with some embodiments.

In various implementations, the operating system 3004 manages hardware resources and provides common services. The operating system 3004 includes, for example, a kernel 3020, services 3022, and drivers 3024. The kernel 3020 acts as an abstraction layer between the hardware and the other software layers, consistent with some embodiments. For example, the kernel 3020 provides memory management, processor management (e.g., scheduling), component management, networking, and security settings, among other functionality. The services 3022 can provide other common services for the other software layers. The drivers 3024 are responsible for controlling or interfacing with the underlying hardware, according to some embodiments. For instance, the drivers 3024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 3006 provide a low-level common infrastructure utilized by the applications 3010. The libraries 3006 can include system libraries 3030 (e.g., C standard library) that can provide functions such as memory allocation functions, string manipulation functions, mathematic functions, and the like. In addition, the libraries 3006 can include API libraries 3032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 3006 can also include a wide variety of other libraries 3034 to provide many other APIs to the applications 3010.

The frameworks 3008 provide a high-level common infrastructure that can be utilized by the applications 3010, according to some embodiments. For example, the frameworks 3008 provide various graphic user interface (GUI) functions, high-level resource management, high-level location services, and so forth. The frameworks 3008 can provide a broad spectrum of other APIs that can be utilized by the applications 3010, some of which may be specific to a particular operating system 3004 or platform.

In an example embodiment, the applications 3010 include a home application 3050, a contacts application 3052, a browser application 3054, a book reader application 3056, a location application 3058, a media application 3060, a messaging application 3062, a game application 3064, and a broad assortment of other applications such as a third party applications 3066 and 3067. According to some embodiments, the applications 3010 are programs that execute functions defined in the programs. Various programming languages can be employed to create one or more of the applications 3010, structured in a variety of manners, such as object-oriented programming languages (e.g., Objective-C, Java, or C++) or procedural programming languages (e.g., C or assembly language). In a specific example, the third party application 3066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 3066 can invoke the API calls 3012 provided by the operating system 3004 to facilitate functionality described herein.

As explained above, some embodiments may particularly include a messaging application 3062. In certain embodiments, this may be a stand-alone application that operates to manage communications with a server system such as server system 102. In other embodiments, this functionality may be integrated with another application such as a media captioning application 3067. Messaging application 3062 may request and display various media content items and may provide the capability for a user to input data related to media content items via a touch interface, keyboard, or using a camera device of machine 3100, communication with a server system via I/O components 3150, and receipt and storage of media content items in memory 3130. Presentation of media content items and user inputs associated with media content items may be managed by messaging application 3062 using different frameworks 3008, library 3006 elements, or operating system 3004 elements operating on a machine 3100.

Figure 31:
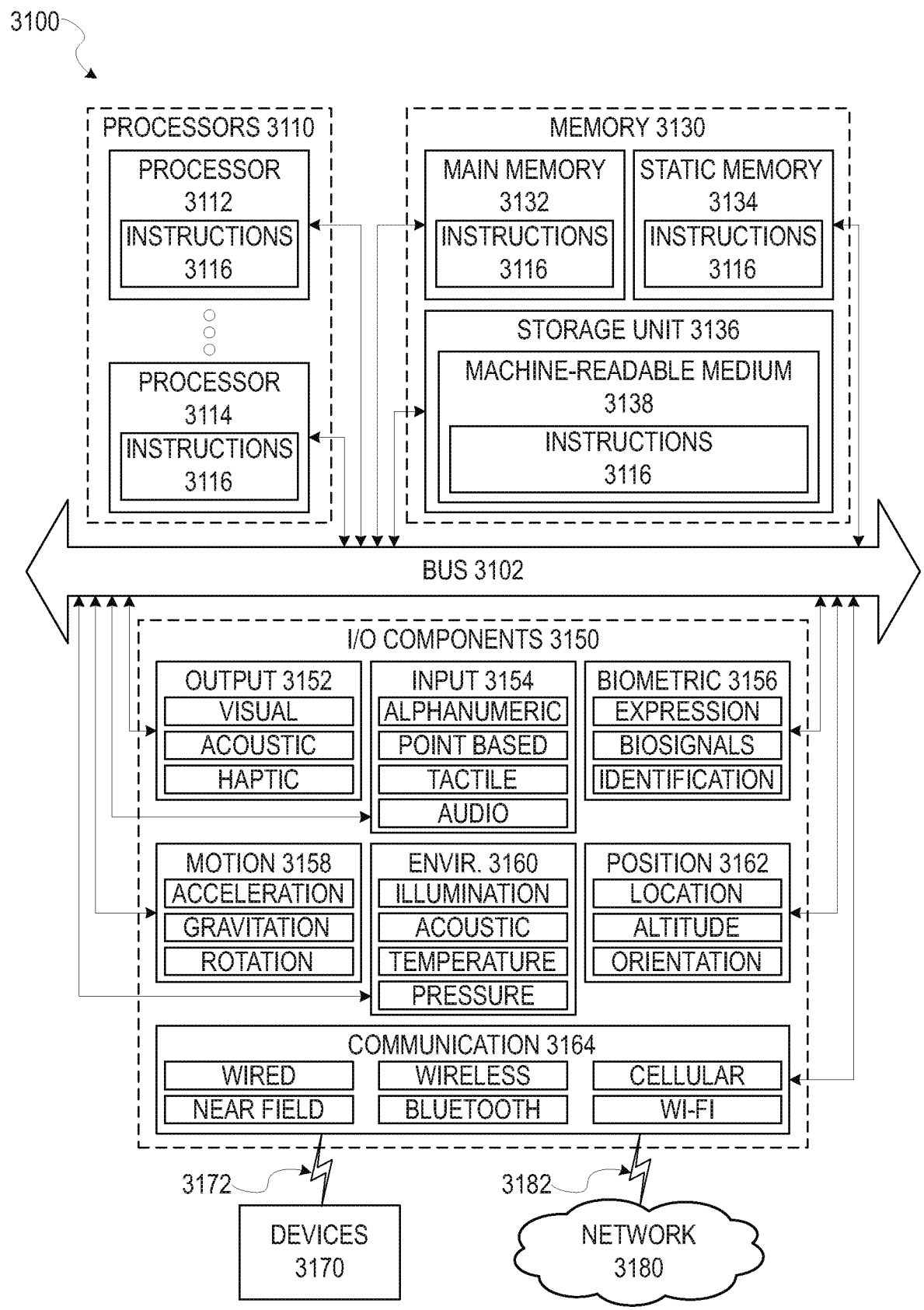
FIG. 31 illustrates a diagrammatic representation of a machine, in the form of a computer system, within which a set of instructions may be executed for causing the machine to perform any one or more of the methodologies discussed herein, according to an example embodiment.

FIG. 31 is a block diagram illustrating components of a machine 3100, according to some embodiments, able to read instructions from a machine-readable medium (e.g., a machine-readable storage medium) and perform any one or more of the methodologies discussed herein. Specifically, FIG. 31 shows a diagrammatic representation of the machine 3100 in the example form of a computer system, within which instructions 3116 (e.g., software, a program, an application 3010, an applet, an app, or other executable code) for causing the machine 3100 to perform any one or more of the methodologies discussed herein can be executed. In alternative embodiments, the machine 3100 operates as a standalone device or can be coupled (e.g., networked) to other machines. In a networked deployment, the machine 3100 may operate in the capacity of a server machine or a client device in a server-client network environment, or as a peer machine in a peer-to-peer (or distributed) network environment. The machine 3100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 3116, sequentially or otherwise, that specify actions to be taken by the machine 3100. Further, while only a single machine 3100 is illustrated, the term "machine" shall also be taken to include a collection of machines 3100 that individually or jointly execute the instructions 3116 to perform any one or more of the methodologies discussed herein.

In various embodiments, the machine 3100 comprises processors 3110, memory 3130, and I/O components 3150, which can be configured to communicate with each other via a bus 3102. In an example embodiment, the processors 3110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 3112 and a processor 3114 that may execute the instructions 3116. The term "processor" is intended to include multi-core processors 3110 that may comprise two or more independent processors 3112, 3114 (also referred to as "cores") that can execute instructions 3116 contemporaneously. Although FIG. 31 shows multiple processors 3110, the machine 3100 may include a single processor 3110 with a single core, a single processor 3110 with multiple cores (e.g., a multi-core processor 3110), multiple processors 3112, 3114 with a single core, multiple processors 3110, 3112 with multiples cores, or any combination thereof.

The memory 3130 comprises a main memory 3132, a static memory 3134, and a storage unit 3136 accessible to the processors 3110 via the bus 3102, according to some embodiments. The storage unit 3136 can include a machine-readable medium 3138 on which are stored the instructions 3116 embodying any one or more of the methodologies or functions described herein. The instructions 3116 can also reside, completely or at least partially, within the main memory 3132, within the static memory 3134, within at least one of the processors 3110 (e.g., within the processor's cache memory), or any suitable combination thereof, during execution thereof by the machine 3100. Accordingly, in various embodiments, the main memory 3132, the static memory 3134, and the processors 3110 are considered machine-readable media 3138.

As used herein, the term "memory" refers to a machine-readable medium 3138 able to store data temporarily or permanently and may be taken to include, but not be limited to, random-access memory (RAM), read-only memory (ROM), buffer memory, flash memory, and cache memory. While the machine-readable medium 3138 is shown, in an example embodiment, to be a single medium, the term "machine-readable medium" should be taken to include a single medium or multiple media (e.g., a centralized or distributed database, or associated caches and servers) able to store the instructions 3116. The term "machine-readable medium" shall also be taken to include any medium, or combination of multiple media, that is capable of storing instructions (e.g., instructions 3116) for execution by a machine (e.g., machine 3100), such that the instructions 3116, when executed by one or more processors of the machine 3100 (e.g., processors 3110), cause the machine 3100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 3150 include a wide variety of components to receive input, provide output, produce output, transmit information, exchange information, capture measurements, and so on. In general, it will be appreciated that the I/O components 3150 can include many other components that are not shown in FIG. 31. The I/O components 3150 are grouped according to functionality merely for simplifying the following discussion, and the grouping is in no way limiting. In various example embodiments, the I/O components 3150 include output components 3152 and input components 3154. The output components 3152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 3154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 3150 include biometric components 3156, motion components 3158, environmental components 3160, or position components 3162, among a wide array of other components. For example, the biometric components 3156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 3158 include acceleration sensor components (e.g., accelerometer), gravitation sensor components (e.g., gyroscope), and so forth. The environmental components 3160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 3162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 3150 may include communication components 3164 operable to couple the machine 3100 to a network 3180 or devices 3170 via a coupling 3182 and a coupling 3172, respectively. For example, the communication components 3164 include a network interface component or another suitable device to interface with the network 3180. In further examples, communication components 3164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 3170 may be another machine 3100 or any of a wide variety of peripheral devices (e.g., a peripheral device coupled via a Universal Serial Bus (USB)).

Moreover, in some embodiments, the communication components 3164 detect identifiers or include components operable to detect identifiers. For example, the communication components 3164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 3164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 3180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 3180 or a portion of the network 3180 may include a wireless or cellular network, and the coupling 3182 may be a Code Division Multiple Access (CDMA) connection, a Global System for Mobile communications (GSM) connection, or another type of cellular or wireless coupling. In this example, the coupling 3182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 3116 are transmitted or received over the network 3180 using a transmission medium via a network interface device (e.g., a network interface component included in the communication components 3164) and utilizing any one of a number of well-known transfer protocols (e.g., Hypertext Transfer Protocol (HTTP)). Similarly, in other example embodiments, the instructions 3116 are transmitted or received using a transmission medium via the coupling 3172 (e.g., a peer-to-peer coupling) to the devices 3170. The term "transmission medium" shall be taken to include any intangible medium that is capable of storing, encoding, or carrying the instructions 3116 for execution by the machine 3100, and includes digital or analog communications signals or other intangible media to facilitate communication of such software.

Furthermore, the machine-readable medium 3138 is non-transitory (in other words, not having any transitory signals) in that it does not embody a propagating signal. However, labeling the machine-readable medium 3138 "non-transitory" should not be construed to mean that the medium is incapable of movement; the medium 3138 should be considered as being transportable from one physical location to another. Additionally, since the machine-readable medium 3138 is tangible, the medium 3138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   analyzing an image to generate proposed bounding regions for a plurality of visual concepts within the image;
   generating a region feature for each of the proposed bounding regions to generate a plurality of region features of the image; and
   for each region feature of the plurality of region features of the image:
      analyzing the region feature to determine for the region feature a detection score that indicates a likelihood that the region feature comprises an actual object; and
      generating a caption for the region feature when the detection score is above a specified threshold value.

2. The method of claim 1, further comprising:
   discarding the region feature when the detection score is below the specified threshold value.

3. The method of claim 1, wherein the caption for the region feature is further generated using a context feature determined for the image using a proposed bounding region that is largest in size of the proposed bounding regions.

4. The method of claim 3, wherein the context feature is determined based on a feature map produced from the image.

5. The method of claim 3, wherein region of interest (ROI) pooling is used for the context feature.

6. The method of claim 1, further comprising:
   localizing the visual concept by adjusting the proposed bounding region around a visual concept of the region feature based on the caption to generate an adjusted bounding region for the visual concept.

7. The method of claim 6, further comprising:
   storing the adjusted bounding region for the visual concept and the caption.

8. The method of claim 1, wherein the proposed bounding regions are generated using a region proposal network to predict visual concept locations and generate the proposed bounding regions with a confidence of enclosing at least one visual concept of the plurality of visual concepts in the image.

9. The method of claim 1, wherein a visual concept of the plurality of visual concepts comprises an object, an object part, an interaction between objects, a scene, or an event.

10. The method of claim 1, wherein region of interest (ROI) pooling is used to ensure that dimensions of the plurality of region features are the same for all the proposed bounding regions.

11. The method of claim 3, wherein the generating the caption for the region feature using the context feature comprises using two Long Short Term Memories (LSTMs) to generate each word of the caption, wherein a first LSTM of the two LSTMs uses the region feature as an input, and a second LSTM of the two LSTMs uses the context feature as an input.

12. The method of claim 11, wherein an output of the two LSTMs is fed into a fusion operator to generate each word of the caption.

13. The method of claim 1, wherein each of the plurality of visual concepts is localized using a Long Short Term Memory (LSTM) that takes a region feature of the plurality of region features for the image as an input and each word generated for the caption as an input.

14. The method of claim 11, wherein each of the plurality of region features is localized using a Long Short Term Memory (LSTM) that takes a region feature of the plurality of region features for the image as an input and each word generated for the caption as an input, and wherein the proposed bounding region is adjusted around each region feature for each word input in the LSTM and wherein the adjusted bounding region for the region feature is generated after a final word of the caption.

15. A dense captioning system comprising:
a memory that stores instructions; and
one or more processors configured by the instructions to perform operations comprising:
analyzing an image to generate proposed bounding regions for a plurality of visual concepts within the image;
generating a region feature for each of the proposed bounding regions to generate a plurality of region features of the image; and
for each region feature of the plurality of region features of the image:
analyzing the region feature to determine for the region feature a detection score that indicates a likelihood that the region feature comprises an actual object; and
generating a caption for the region feature when the detection score is above a specified threshold value.

16. The dense captioning system of claim 15, the operations further comprising:
discarding the region feature when the detection score is below the specified threshold value.

17. The dense captioning system of claim 15, wherein the caption for the region feature is further generated using a context feature determined for the image using a proposed bounding region that is largest in size of the proposed bounding regions.

18. The dense captioning system of claim 17, wherein the context feature is determined based on a feature map produced from the image.

19. The dense captioning system of claim 15, the operations further comprising:
localizing the visual concept by adjusting the proposed bounding region around a visual concept of the region feature based on the caption to generate an adjusted bounding region for the visual concept.

20. A non-transitory computer readable medium comprising instructions stored thereon that are executable by at least one processor to cause a computing device to perform operations comprising:
analyzing an image to generate proposed bounding regions for a plurality of visual concepts within the image;
generating a region feature for each of the proposed bounding regions to generate a plurality of region features of the image; and
for each region feature of the plurality of region features of the image:
analyzing the region feature to determine for the region feature a detection score that indicates a likelihood that the region feature comprises an actual object; and
generating a caption for the region feature when the detection score is above a specified threshold value.

* * * * *